(12) United States Patent
Yamagata et al.

(10) Patent No.: US 11,634,787 B2
(45) Date of Patent: Apr. 25, 2023

(54) GRAIN-ORIENTED ELECTRICAL STEEL SHEET, ANNEALING SEPARATOR, AND METHOD FOR MANUFACTURING GRAIN-ORIENTED ELECTRICAL STEEL SHEET

(71) Applicant: NIPPON STEEL CORPORATION, Tokyo (JP)

(72) Inventors: Ryutaro Yamagata, Tokyo (JP); Nobusato Morishige, Tokyo (JP); Ichiro Tanaka, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/421,215

(22) PCT Filed: Jan. 8, 2020

(86) PCT No.: PCT/JP2020/000338
§ 371 (c)(1),
(2) Date: Jul. 7, 2021

(87) PCT Pub. No.: WO2020/145314
PCT Pub. Date: Jul. 16, 2020

(65) Prior Publication Data
US 2022/0064753 A1   Mar. 3, 2022

(30) Foreign Application Priority Data

Jan. 8, 2019   (JP) .............................. JP2019-001149

(51) Int. Cl.
*C21D 9/46*   (2006.01)
*C22C 38/60*  (2006.01)
(Continued)

(52) U.S. Cl.
CPC ................. *C21D 9/46* (2013.01); *C21D 3/04* (2013.01); *C21D 6/005* (2013.01); *C21D 6/008* (2013.01);
(Continued)

(58) Field of Classification Search
CPC . C21D 9/46; C21D 3/04; C21D 6/005; C21D 6/008; C21D 8/005; C21D 8/1233;
(Continued)

(56) References Cited

U.S. PATENT DOCUMENTS

2009/0047537 A1\* 2/2009 Nanba ..................... C22C 38/04
                                                            428/545
2017/0081740 A1   3/2017 Suehiro et al.
(Continued)

FOREIGN PATENT DOCUMENTS

EP   3 239 324 A1   11/2017
EP   3309271 A1    4/2018
(Continued)

*Primary Examiner* — Humera N. Sheikh
*Assistant Examiner* — Kevin C T Li
(74) *Attorney, Agent, or Firm* — Birch, Stewart, Kolasch & Birch, LLP

(57) ABSTRACT

Grain-oriented electrical steel sheet excellent in magnetic properties and excellent in adhesion of a primary coating to a base steel sheet, an annealing separator utilized for manufacture of grain-oriented electrical steel sheet, and a method for manufacturing grain-oriented electrical steel sheet are proposed. The grain-oriented electrical steel sheet is provided with a base metal steel sheet containing comprising a predetermined chemical composition and a primary coating formed on a surface of the base steel sheet and comprising $Mg_2SiO_4$ as a main constituent. The primary coating satisfies the conditions of (1) the number density D3 of the Al concentrated region: 0.020 to $0.180/\mu m^2$, (2) (total area S5 of regions which is anchoring oxide layer regions and is also Al concentrated regions)/(total area S3 of Al concentrated
(Continued)

regions)≥33%, (3) distance H5 of mean value of length in thickness direction of regions which is anchoring oxide layer regions and is also Al concentrated regions minus H0: 0.4 to 4.0 μm, (4) (total area S1 of anchoring oxide layer regions)/ (observed area S0)≥15%.

17 Claims, 3 Drawing Sheets

(51) Int. Cl.
  *C22C 38/16* (2006.01)
  *C22C 38/06* (2006.01)
  *C22C 38/04* (2006.01)
  *C22C 38/02* (2006.01)
  *C22C 38/00* (2006.01)
  *C21D 8/12* (2006.01)
  *C21D 8/00* (2006.01)
  *C21D 6/00* (2006.01)
  *C21D 3/04* (2006.01)
  *H01F 1/147* (2006.01)

(52) U.S. Cl.
  CPC ........... *C21D 8/005* (2013.01); *C21D 8/1233* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/16* (2013.01); *C22C 38/60* (2013.01); *H01F 1/14766* (2013.01)

(58) Field of Classification Search
  CPC .. C21D 8/1244; C21D 8/1283; C21D 8/1222; C21D 8/1272; C22C 38/001; C22C 38/002; C22C 38/008; C22C 38/02; C22C 38/04; C22C 38/06; C22C 38/16; C22C 38/60; C22C 38/004; C23C 24/04; C23C 24/08; C23C 26/00; C23C 22/57; H01F 1/14766; H01F 1/147; C04B 2235/3208; C04B 2235/323; C04B 2235/3215; C04B 2235/3225; C04B 2235/3227; C04B 2235/3229; C04B 2235/3232; C04B 2235/3244; C04B 2235/448; C04B 2235/5436; C04B 2235/5445; C04B 35/053

See application file for complete search history.

(56) References Cited

U.S. PATENT DOCUMENTS

2018/0371576 A1* 12/2018 Park .................... C21D 8/1255
2019/0276911 A1   9/2019 Kwon et al.

FOREIGN PATENT DOCUMENTS

| JP | 6-88171 A | 3/1994 |
| JP | 8-269552 A | 10/1996 |
| JP | 2005-290446 A | 10/2005 |
| JP | 2008-127634 A | 6/2008 |
| JP | 2012-214902 A | 11/2012 |
| JP | WO2015/174326 A1 | 4/2017 |
| JP | 2017113072 A * | 6/2017 |
| JP | 2018-66061 A | 4/2018 |
| KR | 10-1850133 B1 | 4/2018 |

* cited by examiner

| $\frac{1}{16}$ | $\frac{2}{16}$ | $\frac{1}{16}$ |
|---|---|---|
| $\frac{2}{16}$ | $\frac{4}{16}$ | $\frac{2}{16}$ |
| $\frac{1}{16}$ | $\frac{2}{16}$ | $\frac{1}{16}$ |

GRAIN-ORIENTED ELECTRICAL STEEL SHEET, ANNEALING SEPARATOR, AND METHOD FOR MANUFACTURING GRAIN-ORIENTED ELECTRICAL STEEL SHEET

FIELD

The present invention relates to grain-oriented electrical steel sheet excellent in magnetic properties and coating adhesion, an annealing separator utilized for manufacture of grain-oriented electrical steel sheet, and a method for manufacturing grain-oriented electrical steel sheet.

BACKGROUND

Grain-oriented electrical steel sheet is steel sheet containing, by mass %, Si in 0.5 to 7% or so and having crystal orientations controlled to the {110}<001> orientation (Goss orientation). For control of the crystal orientations, the phenomenon of catastrophic grain growth called secondary recrystallization is utilized.

The method for manufacturing oriented electrical steel sheet is as follows: A slab is heated and hot rolled to produce hot rolled steel sheet. The hot rolled steel sheet is annealed according to need. The hot rolled steel sheet is pickled. The pickled hot rolled steel sheet is cold rolled by a cold rolling rate of 80% or more to produce cold rolled steel sheet. The cold rolled steel sheet is decarburization annealed to cause primary recrystallization. The decarburization annealed cold rolled steel sheet is finish annealed to cause secondary recrystallization. Due to the above process, grain-oriented electrical steel sheet is produced.

After the above-mentioned decarburization annealing and before the finish annealing, an annealing separator having MgO as a main constituent is deposited on the surface of the cold rolled steel sheet. Usually, the method is to coat an aqueous slurry containing the annealing separator components on the cold rolled steel sheet and make it dry. The cold rolled steel sheet with the annealing separator deposited on it is taken up into a coil, then is finish annealed. At the time of finish annealing, the MgO in the annealing separator and the $SiO_2$ in the internal oxide layer formed on the surface of the cold rolled steel sheet at the time of decarburization annealing react whereby a primary coating having forsterite ($Mg_2SiO_4$) as a main constituent is formed on the steel sheet surface. After forming the primary coating, the primary coating is, for example, formed with an insulating coating (also referred to as a "secondary coating") comprised of colloidal silica and a phosphate. The primary coating and insulating coating are smaller in heat expansion coefficient than the steel sheet. For this reason, the primary coating, together with the insulating coating, imparts tension to the steel sheet to reduce the iron loss. The primary coating, furthermore, raises the adhesion of the insulating coating on the steel sheet. Therefore, the adhesion of the primary coating on the steel sheet is preferably higher.

On the other hand, raising the magnetic flux density and lowering the hysteresis loss are effective for lowering the iron loss of grain-oriented electrical steel sheet.

To raise the magnetic flux density of grain-oriented electrical steel sheet, it is effective to control the crystal orientations of the base steel sheet to the Goss orientation. Art for improving integration to the Goss orientation is proposed in PTLs 1 to 3. In these patent literature, elements improving the magnetic properties which strengthen the action of the inhibitors (precipitates suppressing normal crystal grain growth) (Sn, Sb, Bi, Te, Pb, Se, etc.) are contained in the base steel sheet. Due to this, integration of the crystal orientations to the Goss orientation rises and the magnetic flux density of the grain-oriented electrical steel sheet can be raised.

However, the interface of a base steel sheet and primary coating is formed so that the interfacial energy becomes as low as possible by making the interface of the base steel sheet and the primary coating flat. In particular, if the base steel sheet contains elements for improving the magnetic properties, it is easier to make the interface flat. If the interface of the base steel sheet and the primary coating becomes flatter, the anchoring structures of the primary coating causing physical bonding strength between the primary coating and the base steel sheet are lost, so adhesion of the primary coating to the base steel sheet falls.

Art for raising the adhesion of a primary coating with a steel sheet is described in PTLs 4 and 5.

In PTL 4, the slab constituents are made to include Ce in 0.001 to 0.1 mass % and the surface of the steel sheet is formed with a primary coating containing Ce in 0.01 to 1000 m g/m$^2$. In PTL 5, the grain-oriented electrical steel sheet contains Si: 1.8 to 7 mass %, has a primary coating having forsterite as a main constituent, contains in the primary coating one or two of Ce, La, Pr, Nd, Sc, and Y in a basis weight per side of 0.001 to 1000 μm g/m$^2$, and contains one or more of Sr, Ca, and Ba in a basis weight per side of a total amount of 0.01 to 100 m g/m$^2$.

In PTL 5, a method of manufacture including a series of processes for coating and drying an annealing separator on a surface of a base steel sheet which has been decarburization annealed then finish annealing it. A method for manufacturing grain-oriented electrical steel sheet excellent in magnetic properties and coating adhesion characterized by making the annealing separator having MgO as its main constituent contain one or more of oxides, hydroxides, sulfates, or carbonates of Ce, La, Pr, Nd, Sc, and Y with a mean particle size of 0.1 to 25 μm in a total amount with respect to the MgO, converted to metal, of a range of 0.01 to 14 mass % is disclosed.

CITATIONS LIST

Patent Literature

[PTL 1] Japanese Unexamined Patent Publication No. 6-88171
[PTL 2] Japanese Unexamined Patent Publication No. 8-269552
[PTL 3] Japanese Unexamined Patent Publication No. 2005-290446
[PTL 4] Japanese Unexamined Patent Publication No. 2008-127634
[PTL 5] Japanese Unexamined Patent Publication No. 2012-214902

SUMMARY

Technical Problem

Regarding the adhesion of coatings, various studies have been made on peeling of the end faces in shearing operations or peeling of the surface in bending operations, but these strictly speaking cannot be said to propose steel sheets and manufacturing methods optimal for these strictly differentiated. The peeling behavior differs depending on shearing and bending, so in particular in recent years, as electrical steel sheet supplied for manufacture of iron cores with high bending degrees, adhesion where the coating will not peel off when the sheet is bent by conditions more severe than the past has become necessary.

If making an annealing separator contain Y, La, and Ce and Sr, Ca, and Ba to form a primary coating containing Y, La, and Ce and Sr, Ca, and Ba, there are issues remaining such as cases where even if there is no problem with respect to the adhesion of the primary coating with regards to shearing, the adhesion of the primary coating with regard to bending becomes insufficient or cases where the magnetic properties deteriorate etc. A material with adhesion of the primary coating with regard to bending operations (below, referred to simply as "coating adhesion") has been desired.

An object of the present invention is to provide grain-oriented electrical steel sheet excellent in magnetic properties and excellent in adhesion of a primary coating to a base steel sheet, an annealing separator utilized for manufacture of grain-oriented electrical steel sheet, and method for manufacturing grain-oriented electrical steel sheet.

Solution to Problem

The present invention controls and prescribes the structures of the interface of the primary coating and base steel sheet of grain-oriented electrical steel sheet to specify the structures of the primary coating. In this Description, special terms are defined and used for describing the interfacial structures. First, these terms will be explained.

In the present invention, based on the shape features shown schematically in FIG. 1, the primary coating is divided into two regions in the thickness direction and the structures at the respective regions are prescribed. In the following explanation, to express the two regions, the surface side will be referred to using the term the "surface oxide layer (1)" and the base steel sheet side will be referred to using the term the "anchoring oxide layer (2)". The surface oxide layer (1) is the region in the thickness direction in which the part of the primary coating covering the surface of the base steel sheet relatively evenly (below, this will sometimes be described as the "surface oxides") is present. The anchoring oxide layer (2) is the region in the thickness direction in which parts of the primary coating penetrating into the base steel sheet (below, this will sometimes be described as the "anchoring oxides") are present. The reference value H0 of the depth dividing the two will be explained later.

Such structures of the interface of the primary coating and the base steel sheet, in particular the characteristic shapes, in general are sometimes expressed using the term "roots".

The interface between the primary coating and base steel sheet of the grain-oriented electrical steel sheet forms an uneven shapes in which the anchoring oxides penetrate to the inside of the base steel sheet. If the depth of penetration of the anchoring oxides becomes deeper and the number density of oxide particles ($/\mu m^3$) increases, the adhesion of the primary coating to the base steel sheet rises due to the so-called "anchor effect".

On the other hand, if anchoring oxides penetrate inside of the base steel sheet too much, they will become factors obstructing the crystal grain growth of the steel sheet at the time of secondary recrystallization or the domain wall movement at the time of magnetization and the magnetic properties will deteriorate.

Further, the primary coating has the effect of imparting tension to the steel sheet and lowering the iron loss. To increase the tension, the surface oxide layer (1) is preferably high in content of $Mg_2SiO_4$ with the small coefficient of linear expansion, while the surface oxide layer (1) is preferably thick.

The inventors investigated and studied the magnetic properties of grain-oriented electrical steel sheet containing elements for improving the magnetic properties and the adhesion of a primary coating formed using an annealing separator containing Y, La, and Ce and Ca, Sr, and Ba based on the above general assumptions. In the following explanation, one or more elements selected from a group comprising Y, La, and Ce will sometimes be described together as "Y group elements" and one or more elements selected from a group comprising Ca, Sr, and Ba will sometimes be described together as "Ca group elements".

As a result, the inventors obtained the following findings.

If making the annealing separator contain Y group elements and Ca group elements to form the primary coating, even if the coating adhesion with respect to shearing is sufficient, sometimes the coating adhesion with respect to bending will not be sufficiently obtained. Further, in steel sheet where the coating adhesion with respect to bending is not good, often the iron loss or magnetic flux density will also not be good.

After this, if not necessary to clearly differentiate between the coating adhesion with respect to shearing and the coating adhesion with respect to bending, they will be simply referred to as "adhesion" used with the intension of inclusion of coating adhesion with respect to shearing and coating adhesion with respect to bending.

The inventors further studied the effects of the Y group elements and Ca group elements in the annealing separator and as a result obtained the following findings.

If the annealing separator contains Y group elements, the anchoring oxide layer (2) becomes thicker. Due to this, the coating adhesion with respect to shearing is improved.

Further, if the annealing separator contains Ca group elements, if these elements are suitably dispersed in the annealing separator, the number density of the anchoring oxide layer (2) of the primary coating formed increases and the coating adhesion with respect to shearing is improved. Furthermore, if the size of the particles containing the Ca group elements in Ca group element concentrated regions prescribed below in the primary coating is a suitable size with respect to the MgO particle size, the coating adhesion with respect to bending becomes higher and deterioration of the magnetic properties is suppressed. At this time, the surface oxide layer (1) becomes uniform in thickness and the $Mg_2SiO_4$ phases increase. The improvement of the coating adhesion with respect to bending is believed to be caused by the thickness of the surface oxide layer (1) becoming uniform and concentration of local stress at regions of the surface oxide layer (1) which are thin in thickness being avoided at the time of bending operations. Further, the improvement of the magnetic properties is believed to be due to the higher tension acting on the steel sheet due to the increase in the amount of $Mg_2SiO_4$ phases in the surface oxide layer (1).

Furthermore, it was clarified that a primary coating having such excellent properties is characterized not only simply by the uneven shapes of the interfacial structures, but also the form of presence of Al near the interface of the primary coating. Further, the features of the annealing separator used for forming such a primary coating were clarified.

The interface of a base steel sheet and primary coating becomes a complicated three-dimensional shape having uneven shapes such as shown in FIG. 1 The features of the form of presence of Al which were clarified should inherently be quantized as "three-dimensional structures", but are three-dimensional complicated structures. For this reason, the inventors experimented with projecting information relating to the interfacial structures on a plane parallel to the surface of the steel sheet such as explained later and prescribing features of the interface at the "plane". Further, it was confirmed that the effect of the present invention can be evaluated and explained by quantitative provisions based on the "features on the projection plane".

The characterizing feature of the present invention obtained by these findings are as follows:

That is, if the primary coating having $Mg_2SiO_4$ as its main constituent and the interface of the primary coating and base steel sheet satisfy the features shown in the following (1) to (4), the anchoring oxide layer (2) and the surface oxide layer (1) become suitable and achievement of both adhesion of the primary coating against shearing and bending and the iron loss characteristic becomes possible.

(1) Number density D3 of number of Al concentrated regions: 0.020 to $0.180/\mu m^2$, (2) (Area S5 of regions which is anchoring oxide layer regions and is also Al concentrated regions)/(area S3 of Al concentrated regions)≥0.33 (33%), (3) Distance H5 of mean value of heights in thickness direction of regions which is anchoring oxide layer regions and is also Al concentrated regions minus H0: 0.4 to 4.0 μm, (4) (Total area S1 of anchoring oxide layer regions)/(observed area S0)≥0.15 (15%).

Further, a primary coating comprising Y group elements and Ca group elements and satisfying the conditions of the following (5) to (7) is a preferable form.

(5) Total content of Y group elements: 0.1 to 6.0 mass %,
(6) Total content of Ca group elements: 0.1 to 6.0 mass %,
(7) Number density D4 of Ca group element concentrated regions: $0.008/\mu m^2$ or more.

Further, an annealing separator having MgO as a main constituent and comprising Y group elements and Ca group elements able to form the above primary coating can be prescribed by the conditions of the following (8) to (13).

(8) (0.253[Y]+0.180[La]+0.170[Ce])/0.454[Mg]×100 (%): 0.40 to 3.60%, (9) (0.353[Ca]+0.252[Sr]+0.195[Ba])/0.454[Mg]×100 (%): 0.20 to 2.20%,

(10) Mean particle size R1 of MgO: 0.08 to 1.50 μm,

(11) Mean particle size R2 of particles comprising Ca group elements in annealing separator: 0.08 to 1.50 μm,

(12) (Mean particle size R2)/(mean particle size R1)=0.3 to 3.0,

Further, the conditions of the above (8) to (12) are preferably realized in the layer of the annealing separator formed at the surface of the steel sheet right before finish annealing in at least the region down to 3.0 μm from the surface of the base steel sheet.

Further, the particles of the raw material powder comprising the Ca group elements easily aggregate in the period up to when being coated and dried on the surface of the steel sheet, so in the raw material powder,

(13) Number density of particles comprising Ca group elements≥$25,000,000,000/cm^3$ must be satisfied.

The gist of the present invention obtained by these findings is as follows:

The grain-oriented electrical steel sheet according to the present invention comprises a base steel sheet having a chemical composition comprising, by mass %, C: 0.0050% or less, Si: 2.5 to 4.5%, Mn: 0.02 to 0.20%, one or more elements selected from the group comprised of S and Se: total of 0.005% or less, sol. Al: 0.010% or less, and N: 0.010% or less and having a balance comprised of Fe and impurities and a primary coating formed on a surface of the base steel sheet and comprising $Mg_2SiO_4$ as a main constituent, where, in a correlation distribution chart of a characteristic X-ray intensity and a surface height of the primary coating laid out by projecting the surface height of the primary coating and constituent information in the primary coating on a plane parallel to the base steel sheet side, in a thickness direction of the base steel sheet when designating a direction from the primary coating side toward the base steel sheet as positive, when designating a center value of the surface height of the primary coating as H0, designating the primary coating existing at the base steel sheet side from H0+0.2 μm as an "anchoring oxide layer region", designating the primary coating existing at the primary coating side from H0+0.2 μm as a "surface oxide layer region", identifying a maximum value of the characteristic X-ray intensity of Al, and designating a region in which a characteristic X-ray intensity of Al is 20% or more of the maximum value of the Al as an "Al concentrated region", the primary coating satisfies the conditions of (1) number density D3 of Al concentrated regions: 0.020 to $0.180/\mu m^2$ (2) (total area S5 of regions which is anchoring oxide layer regions and is also Al concentrated regions)/(total area S3 of Al concentrated regions)≥33%, (3) distance H5 subtracting H0 from mean value of height of regions which is anchoring oxide layer regions and us also Al concentrated regions in thickness direction: 0.4 to 4.0 μm, and (4) (total area S1 of anchoring oxide layer regions)/(observed area S0)≥15%.

Further, the grain-oriented electrical steel sheet is characterized in that the primary coating comprises one or more elements selected from a group comprising Y, La, and Ce and one or more elements selected from a group comprising Ca, Sr, and Ba and, in the correlation distribution chart of a characteristic X-ray intensity and a surface height of the primary coating, when identifying the maximum values of the characteristic X-ray intensities of Ca, Sr, and Ba and designating a region in which a characteristic X-ray intensity of Ca of 20% or more of the maximum value of the Ca is obtained, a region in which a characteristic X-ray intensity of Sr of 20% or more of the maximum value of the Sr is obtained, and a region in which a characteristic X-ray intensity of Ba of 20% or more of the maximum value of the Ba is obtained together as a "Ca group element concentrated region", the primary coating satisfies the conditions of (5) a ratio of a total content of one or more elements selected from a group comprising Y, La, and Ce to the $Mg_2SiO_4$ in the primary coating: 0.1 to 6.0 mass %, (6) a ratio of a total content of one or more elements selected from a group comprising Ca, Sr, and Ba to the $Mg_2SiO_4$ in the primary coating: 0.1 to 6.0 mass %, and (7) a number density D4 of the Ca group element concentrated regions: $0.008/\mu m^2$ or more.

The annealing separator used for manufacturing the grain-oriented electrical steel sheet according to the present invention is an annealing separator having MgO as a main constituent, which annealing separator is characterized by comprising one or more elements selected from a group comprising Y, La, and Ce and one or more elements selected from a group comprising Ca, Sr, and Ba, when expressing ratios of contents of Mg, Y, La, Ce, Ca, Sr, and Ba to the content of MgO (mass %) as respectively [Mg], [Y], [La], [Ce], [Ca], [Sr], and [Ba], satisfying (8) (0.253[Y]+0.180[La]+0.170[Ce])/0.454[Mg]: 0.40 to 3.60 and (9) (0.353[Ca]+0.252[Sr]+0.195[Ba])/0.454[Mg]: 0.20 to 2.20, and furthermore, satisfying the conditions of

(10) mean particle size R1 of MgO: 0.08 to 1.50 μm,

(11) mean particle size R2 of particles comprising one or more elements selected from a group comprising Ca, Sr, and Ba: 0.08 to 1.50 μm,

(12) (mean particle size R2)/(mean particle size R1): 0.3 to 3.0, and

(13) number density of particles comprising Ca group elements≥25,000,000,000/cm³.

Further, the annealing separator is characterized in that the particles comprising one or more elements selected from a group comprising Y, La, and Ce further comprise oxygen.

The method for manufacturing grain-oriented electrical steel sheet according to the present invention comprises a process for hot rolling a slab comprising, by mass %, C: 0.100% or less, Si: 2.5 to 4.5%, Mn: 0.02 to 0.20%, one or more elements selected from the group comprised of S and Se: total of 0.005 to 0.070%, sol. Al: 0.005 to 0.050%, and N: 0.001 to 0.030% and having a balance comprised of Fe and impurities to manufacture hot rolled steel sheet, a process of cold rolling the hot rolled steel sheet by a cold rolling rate of 80% or more to manufacture cold rolled steel sheet, a process of decarburization annealing the cold rolled steel sheet to manufacture decarburization annealed sheet, a process of coating a surface of the decarburization annealed sheet with an aqueous slurry, and a process of finish annealing the steel sheet after the aqueous slurry has dried, where the substance covering the surface of the steel sheet after the drying is the above aqueous slurry.

The method for manufacturing finish annealing-use steel sheet for manufacturing the grain-oriented electrical steel sheet according to the present invention comprises a process for hot rolling a slab comprising, by mass %, C: 0.100% or less, Si: 2.5 to 4.5%, Mn: 0.02 to 0.20%, one or more elements selected from the group comprised of S and Se: total of 0.005 to 0.070%, sol. Al: 0.005 to 0.050%, and N: 0.001 to 0.030% and having a balance comprised of Fe and impurities to manufacture hot rolled steel sheet, a process of cold rolling the hot rolled steel sheet by a cold rolling rate of 80% or more to manufacture cold rolled steel sheet, a process of decarburization annealing the cold rolled steel sheet to manufacture decarburization annealed sheet, and a process of coating a surface of the decarburization annealed sheet with an aqueous slurry and drying the sheet, wherein the substance covering the surface of the steel sheet after drying is the above annealing separator.

Advantageous Effects of Invention

The grain-oriented electrical steel sheet according to the present invention is excellent in magnetic properties and excellent in adhesion of a primary coating to a base steel sheet. Further, the annealing separator according to the present invention is used in the manufacturing process of the grain-oriented electrical steel sheet of the present invention. Further, the method of manufacture of the present invention using the annealing separator of the present invention can be used to manufacture the grain-oriented electrical steel sheet of the present invention.

DESCRIPTION OF EMBODIMENTS

Figures 1, 2:
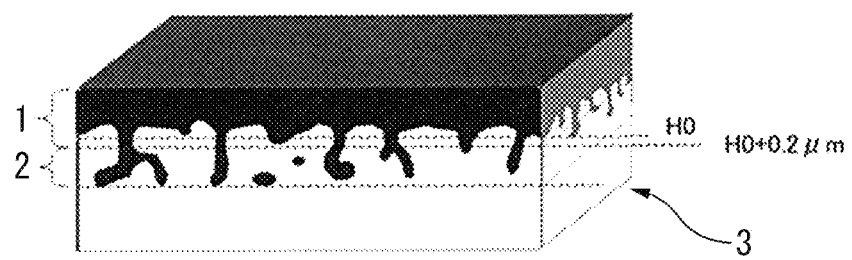
FIG. 1 is a schematic view of a 20 μm×15 μm sample of the primary coating.
FIG. 2 is a view for explaining a Gaussian filter applied to height information data of a primary coating obtained by a laser microscope.

Details will be explained later, but in the present invention, to identify the structures of the interface of the primary coating and base steel sheet of the grain-oriented electrical steel sheet, the surface of the primary coating peeled off from the grain-oriented electrical steel sheet at the side which had been adhered to the base steel sheet, that is, the surface of the primary coating at the side forming the interface of the primary coating and the base steel sheet, is examined. This observed surface is analyzed by a scan type confocal laser microscope to obtain the distribution of uneven shapes at the interface (information of interface in depth direction). Further, the observed surface was analyzed using an SEM-EDS. The distributions of concentration of the various elements present in the primary coating were obtained from the characteristic X-ray intensities. The observations of these equipment are performed in the direction vertical to the surface of the steel sheet peeled from, so the obtained information is information on the primary coating having a three-dimensional structure (position and characteristic X-ray intensity) projected on a plane parallel to the surface of the steel sheet.

In the explanation regarding the interface in the Description from here on, it should be noted in advance that the explanation uses the "features on the projection plane". For example, the "area" relating to the structures of the interface is the area obtained on the projection plane. The regions of presence of elements are identified based on the characteristic X-ray intensities of the elements obtained on the projection plane.

However it is confirmed that the information on the primary coating obtained on the projection plane enables explanation of the characterizing features of the present invention without problem. Using the information of the primary coating on the projection plane to explain the present invention needless to say does not cause any loss of significance of the present invention in which the three-dimensional structure of the primary coating is considered the inherent characterizing feature.

Further, in this Description, unless otherwise indicated, further, regarding the numerical values A and B, the expression "A to B" shall mean "A or more and B or less". In this expression, when only the numerical value B is assigned a unit, that unit shall also apply to the numerical value A. Further, in this Description, the "main constituent" means the constituent contained in 50 mass % or more in a certain substance and preferably means 70 mass % or more, more preferably 90 mass % or more.

Below, the grain-oriented electrical steel sheet according to the present invention, annealing separator, and method for manufacture of the present invention will be explained in detail. In this Description, the "%" regarding the contents of elements will mean "mass %" unless otherwise indicated.

The grain-oriented electrical steel sheet according to the present invention is provided with a base steel sheet and a primary coating formed on the surface of the base steel sheet.

Base Steel Sheet

The chemical composition of the base steel sheet forming the grain-oriented electrical steel sheet of the present invention contains the following elements. However, the characterizing feature of the present invention lies in the primary coating. The base steel sheet does not have to be a special one.

C: 0.0050% or less

Carbon (C) is an element effective for the microstructure control up to completion of the decarburization annealing in the manufacturing process, but if the content of C is over 0.0050%, the magnetic properties of the grain-oriented electrical steel sheet of the final product sheet fall. Therefore, the content of C is 0.0050% or less. The content of C is preferably as low as possible. However, even if reducing the content of C to less than 0.0001%, the manufacturing costs just build up. The above effect does not change much at all. Therefore, the preferable lower limit of the content of C is 0.0001%.

Si: 2.5 to 4.5%

Silicon (Si) raises the electrical resistance of steel to reduce the eddy current loss. If the content of Si is less than 2.5%, the above effect is not sufficiently obtained. On the other hand, if the content of Si is over 4.5%, the cold workability of the steel falls. Therefore, the content of Si is 2.5 to 4.5%. The preferable lower limit of the content of Si is 2.6%, more preferably 2.8%. The preferable upper limit of the content of Si is 4.0%, more preferably 3.8%.

Mn: 0.02 to 0.2%

Manganese (Mn) bonds with S and Se in the manufacturing process to form MnS and MnSe. These precipitates function as inhibitors (inhibitors of normal crystal grain growth) and in steel cause secondary recrystallization. Mn further raises the hot workability of steel. If the content of Mn is less than 0.02%, the above effect is not sufficiently obtained. On the other hand, if the content of Mn is over 0.2%, secondary recrystallization does not occur and the magnetic properties of the steel fall. Therefore, the content of Mn is 0.02 to 0.2%. The preferable lower limit of the content of Mn is 0.03%, more preferably 0.04%. The preferable upper limit of the content of Mn is 0.13%, more preferably 0.10%.

One or more elements selected from group comprised of S and Se: total of 0.005% or less Sulfur (S) and selenium (Se) bond with Mn in the manufacturing process to form MnS and MnSe functioning as inhibitors. However, if the contents of these elements are over a total of 0.005%, due to the remaining inhibitors, the magnetic properties fall. Furthermore, due to segregation of S and Se, in grain-oriented electrical steel sheet, sometimes surface defects are caused. Therefore, in grain-oriented electrical steel sheet, the total content of the one or more elements selected from the group comprised of S and Se is 0.005% or less. The total of the contents of S and Se in the grain-oriented electrical steel sheet is preferably as low as possible. However, even if reducing the total of the content of S and the content of Se in the grain-oriented electrical steel sheet to less than 0.0005%, the manufacturing costs just build up. The above effect does not change much at all. Therefore, the preferable lower limit of the total content of the one or more elements selected from the group comprised of S and Se in the grain-oriented electrical steel sheet is 0.0005%.

Sol. Al: 0.010% or less

Aluminum (Al) bonds with N in the manufacturing process to form AlN functioning as an inhibitor. However, if the content of sol. Al in the grain-oriented electrical steel sheet is over 0.010%, the inhibitor excessively remains in the base steel sheet, so the magnetic properties fall. Therefore the content of sol. Al is 0.010% or less. The preferable upper limit of the content of sol. Al is 0.004%, more preferably 0.003%. The content of sol. Al is preferably as low as possible. However, even if reducing the content of sol. Al in the grain-oriented electrical steel sheet to less than 0.0001%, the manufacturing costs just build up. The above effect does not change much at all. Therefore, the preferable lower limit of the content of sol. Al in the grain-oriented electrical steel sheet is 0.0001%. Note that, in this Description, sol. Al means "acid soluble Al". Therefore the content of sol. Al is the content of acid soluble Al.

What to take note of is that the Al of the characterizing feature of the primary coating of the present invention is derived from the base steel sheet as explained later. For this reason, at first glance, the fact that the Al content of the base steel sheet is zero would seem to be contradictory to the presence of Al in the primary coating, but what concentrates at the primary coating is the "Al which had been contained in the base steel sheet in the middle of manufacture". In the grain-oriented electrical steel sheet of the present invention, after concentration of the Al of the characterizing feature of the present invention occurs, the Al of the base steel sheet is discharged to outside the system by the high temperature heat treatment also called "purification annealing" of one process of finish annealing. For this reason, the final base steel sheet not containing Al and the final primary coating having Al derived from the base steel sheet present are not contradictory.

N: 0.010% or less

Nitrogen (N) bonds with Al in the manufacturing process of grain-oriented electrical steel sheet to form AlN which functions as an inhibitor. However, if the content of N in the grain-oriented electrical steel sheet is over 0.01%, the above inhibitor excessively remains in the grain-oriented electrical steel sheet, so the magnetic properties fall. Therefore, the content of N is 0.01% or less. The preferable upper limit of the content of N is 0.004%, more preferably 0.003%. The content of N is preferably as low as possible. However, even if reducing the total of the content of N in the grain-oriented electrical steel sheet to less than 0.0001%, the manufacturing costs just build up. The above effect does not change much at all. Therefore, the preferable lower limit of the content of N in the grain-oriented electrical steel sheet is 0.0001%.

The balance of the chemical composition of the base steel sheet of the grain-oriented electrical steel sheet according to the present invention is comprised of Fe and impurities. Here, "impurities" mean the following elements which enter from the ore used as the raw material, the scrap, or the manufacturing environment etc. when industrially manufacturing the base steel sheet or remain in the steel without being completely removed in the purification annealing and which are allowed to be contained in a content not having a detrimental effect on the action of the grain-oriented electrical steel sheet according to the present invention.

Regarding Impurities

Regarding copper (Cu), tin (Sn), antimony (Sb), bismuth (Bi), tellurium (Te), and lead (Pb), part of the Cu, Sn, and Sb, Bi, Te, and Pb in the base steel sheet is discharged outside of the system by high temperature heat treatment also known as "purification annealing" of one process of the finish annealing. These elements raise the selectivity of orientation of the secondary recrystallization in the finish annealing to exhibit the action of improvement of the magnetic flux density, but if remaining in the base steel sheet after completion of the finish annealing, cause the deterioration of the iron loss as simple impurities. Therefore, the total content of the one or more elements selected from the group comprising Cu, Sn, and Sb, Bi, Te, and Pb is 0.30% or less. As explained above, these elements are impurities, so the total content of these elements is preferably as low as possible.

Primary Coating

The characterizing feature of the primary coating is most important in the present invention. This characterizing feature, as explained before, also includes limitation of the measurement method. In the present invention, information of the interface of the primary coating and base steel sheet is projected on a plane parallel to the surface of the steel sheet and is prescribed on that plane (from here on, sometimes simply described as the "projection plane"). To obtain a grasp of the characterizing feature of the primary coating, understanding the measurement method is considered important, so first the measurement method will be explained.

Method of Measurement of Interfacial Structures

Grain-oriented electrical steel sheet with a primary coating formed on its surface is electrolyzed by a constant potential in an electrolytic solution so that only the base steel sheet begins to be dissolved, then the primary coating is separated from the base steel sheet and used as the sample for observation. Note that, in the electrolysis for obtaining the sample, the base steel sheet of the interface is selectively electrolyzed, so there is no need to electrolyze the entire base steel sheet. A suitable amount of electrolysis may be set. The amount of electrolysis is for example 80 C/cm$^2$. In separation of the primary coating, there is the method of attaching the primary coating on the adhesive surface of a commercially available metal tape etc., then removing the base steel sheet and observing what remains at the tape side, the method of using paraffin to envelop it, then removing the paraffin, etc.

After this, this separated primary coating will sometimes be referred to as the "interface observation sample" and the surface of the primary coating to be observed at the side adhered to the base steel sheet will sometimes be referred to as the "observed surface".

Next, the interface observation sample is observed by various types of observation equipment from a direction vertical to the surface of the steel sheet peeled from (thickness direction of grain-oriented electrical steel sheet). Accordingly, the data obtained from the equipment becomes information of the interface observation sample laid out on a projection plane. The following explanation is given predicated on this data on the projection plane. That is, for example, the description "at the interface" is an explanation of the state of the data on the projection plane. Here, the direction in the thickness direction from the primary coating side to the base steel sheet side is defined as positive. The term "height" used below expresses the direction from the primary coating side toward the base steel sheet side as high.

The observed surface of the interface observation sample is analyzed for characteristic X-ray intensities of Ca, Sr, Ba, and Al using a SEM-EDS (model no.: JSM-7900F, made by JEOL). At this time, the scan steps are made 0.1 μm and a 200×150 pixel characteristic X-ray intensity distribution chart is obtained on the projection plane. Any 200×150 pixel observed region is selected.

Further, the region completely surrounding the above observed region which does not contact the above observed region analyzed for characteristic X-ray intensities at its ends is analyzed by a scan type confocal laser microscope (Model No. VK9710, made by Keyence) to obtain uneven shape data of the observed surface on the projection plane. At this time, the scan steps are made 0.1 μm. The obtained 200×150 pixel data array is smoothed once by a size 3×3 Gaussian filter (FIG. 2). Furthermore, the data array after smoothing is corrected by automatic quadric surface correction based on the centerline in the width direction and the centerline in the height direction to obtain a data array after correction. Here, if making the scan steps for measurement of uneven shapes D m not 0.1 μm, the uneven shape data array is shrunken to a 0.1/D size by bilinear interpolation to obtain a pseudo uneven shape distribution with intervals between data points of 0.1 μm.

Figure 3:
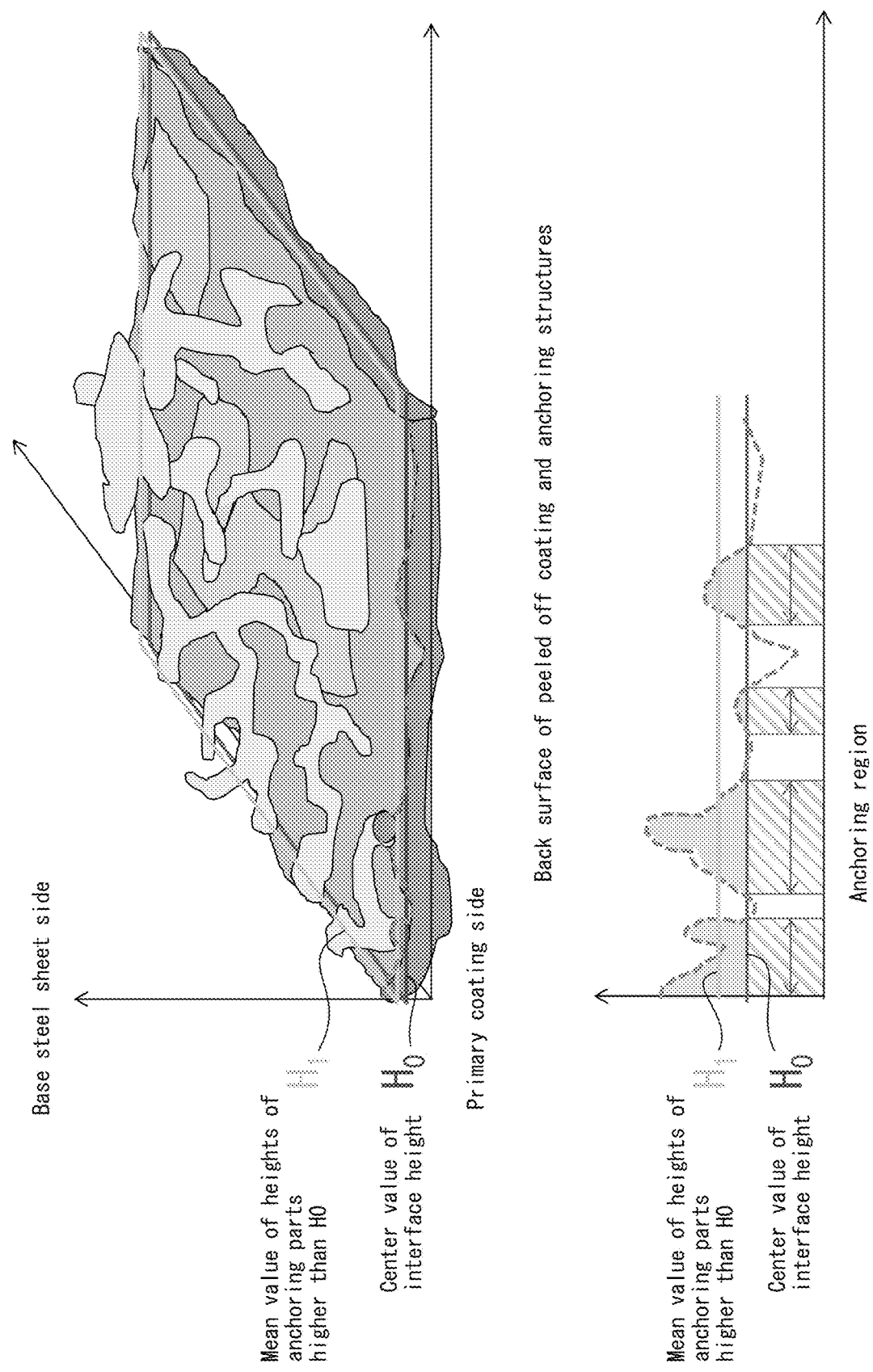
FIG. 3 is a schematic view showing a three-dimensional structure of a back surface and anchoring parts of a peeled off primary coating.

FIG. 3 is a schematic view showing the back surface of the peeled off primary coating and the three-dimensional structure of the anchoring parts. H0 is the center value of surface height of the primary coating. H1 is the mean value of the heights of the anchoring parts present at positions higher than H0. These positions (H1−H0) are, in the present invention, 0.40 to 2.00 μm. FIG. 3 is projected on a plane parallel to the surface of the steel sheet and is a projection plane having uneven shape distribution information of heights. Further, from the uneven shape distribution, a data array of 200×150 points at a position corresponding to each region of 200×150 pixels selected from the characteristic X-ray intensity distribution chart is specified. That is, each 200×150 pixel region of the digital image of the characteristic X-ray intensity distribution chart is made so that all of the pixels have single uneven shape data (heights).

Below, this will be called a characteristic X-ray intensity and height correlation distribution chart. A schematic view expressing this is shown in FIG. 4.

The method of identifying the form of the coating by the information obtained from this figure will be explained.

From the thus obtained characteristic X-ray intensity and height correlation distribution chart, the following procedure is used to determine the regions A0 to A5 explained below.

Figure 4:
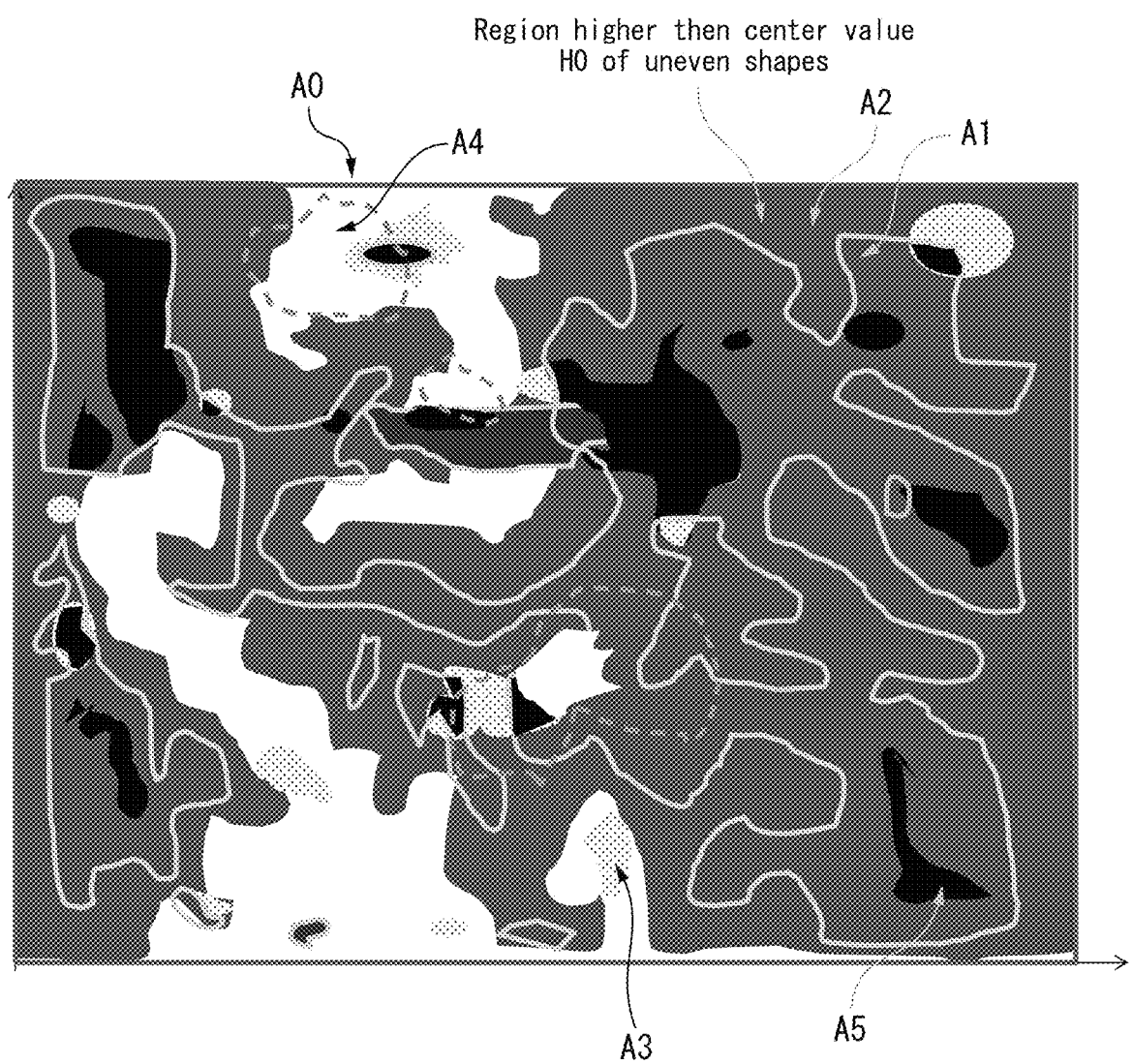
FIG. 4 is a view explaining a characteristic X-ray intensity and height correlation distribution chart.

In the schematic view of the characteristic X-ray intensity and uneven shape correlation distribution chart shown in FIG. 4, the entire observed region inside the outermost box is shown by A0. The regions colored dark gray are parts higher than the center value H0 of the uneven shapes. The insides of the parts shown by the light gray lines are regions (anchoring oxide regions) A1 a further 0.2 μm higher than H0. The outsides of the parts shown by the light gray lines are the surface oxide layer regions A2. The Al (aluminum) concentrated regions are represented by A3 (shown by dots) and A5 (shown by black). In particular, A5 shows Al (aluminum) concentrated regions present inside the anchoring oxide regions (A1). The regions of A4 (parts inside dotted lines) show the Ca group element concentrated regions explained below.

The region A0 is the observed region as a whole, that is, a 20 μm×15 μm region. All of the pixels of the characteristic X-ray intensity and height correlation distribution chart correspond to this region A0. Below, A0 will sometimes be referred to as the "observed region".

The regions A1 and the regions A2 are classified based on the distribution of height of the characteristic X-ray intensity and height correlation distribution chart.

In the present invention, the primary coating is classified into two types of regions in the thickness direction based on the position H0 in the direction of thickness of the steel sheet, that is, the "anchoring oxide layer (2)" and "surface oxide layer (1)", as described above (FIG. 1). The regions A1 and the regions A2 are regions laid out on the projection plane.

H0 is the center value of the surface height of the primary coating of the height data of the characteristic X-ray intensity and height correlation distribution chart. Here, it is the arithmetic mean value of two height values close to the center of 200×150 particles. Further, a region of a height of H0+0.2 µm or more in the thickness direction is an "anchoring oxide layer (2)" while what is seen on the projection plane is an "anchoring oxide layer region" A1. In the same way, a region of a height of less than H0+0.2 µm in the thickness direction is a "surface oxide layer (1)" and is a "surface oxide layer region" A2 on the projection plane.

The regions A3 and the regions A4 are classified based on the distribution of height of the characteristic X-ray intensity and height correlation distribution chart.

In the distribution of the characteristic X-ray intensity of the Al (aluminum) of the characteristic X-ray intensity and height correlation distribution chart, the maximum value of the characteristic X-ray intensity of Al is identified and a region where a characteristic X-ray intensity of Al is 20% or more of the maximum value of the characteristic X-ray intensity of Al is designated as A3. Below, a region A3 will be referred to as an "Al concentrated region".

Further, in the characteristic X-ray intensity and height correlation distribution chart, the characteristic X-ray intensities of Ca, Sr, and Ba are identified and a region combining a region where a characteristic X-ray intensity of Ca of 20% or more of the maximum value of the characteristic X-ray intensity of Ca is obtained, a region where a characteristic X-ray intensity of Sr of 20% or more of the maximum value of the characteristic X-ray intensity of Sr is obtained, and a region where a characteristic X-ray intensity of Ba of 20% or more of the maximum value of the characteristic X-ray intensity of Ba is obtained is A4. That is, a region A4 is a region where the characteristic X-ray intensity of any element of Ca, Sr, and Ba becomes an intensity of 20% or more of the maximum characteristic X-ray intensity of that element. Below, a region A4 will be referred to as a "Ca group element concentrated region".

Furthermore, a region present in the anchoring oxide layer region Al and comprised of an Al (aluminum) concentrated region A3 is identified as A5. Below, a region A5 will be referred to as an "anchoring Al (aluminum) region".

Next, in the above regions, the number densities of the numbers of the regions ($/\mu m^2$), the total areas of the regions ($\mu m^2$), and the positions of the regions in the thickness direction (height (m)) are identified. The areas are required in the regions A0, A1, A3, and A5. The total areas of the same are designated as S0, S1, S3, and S5.

The number densities of the numbers of the regions are necessary in A3 and A4. The number densities of the regions of A3 and A4 are respectively made D3 and D4. In identification of the number densities of the numbers of regions, if pixels in 200×150 pixels continue up and down or left and right, these are deemed single regions. Further, regions comprised of three or less pixels are deemed as noise and excluded in identifying the numbers of regions. Note that, the scan steps at the time of measurement are 0.1 µm (more specifically, 0.092 µm), so the area of one pixel, as explained above, becomes area of region=0.1 µm×0.1 µm (more specifically, 0.092 µm×0.092 µm)×number of regions.

It goes without saying, but for example D3 is, for the regions A3, the value of the total number of regions measured while deeming regions where pixels continue in pixel units as single regions divided by the area of the observed region A0 (that is, the entire observed area S0). D4 is also calculated by a similar method.

The positions of the regions in the thickness direction are required in the regions A5. The position of a region A5 is designated as H5. Note that, this position is identified based on the H0 of the interface of the surface oxide layer (1) and the anchoring oxide layer (2). Specifically, it is the value of the mean value of heights for all pixels of a region A5 minus H0. A region A5 is a region where the height in the characteristic X-ray intensity and height correlation distribution chart is a position of H0+0.2 µm or more, so the mean value of the heights of the pixels of a region A5 is always H0+0.2 µm or more. As a result, H5 becomes a value of 0.2 µm or more.

Characterizing Feature of Primary Coating/Al Distribution

Below, the primary coating characterizing the present invention will be explained. The primary coating of the present invention has $Mg_2 SiO_4$ as its main constituent, but there is a major characterizing feature in the Al distribution near the interface of the primary coating and the base steel sheet. First, this will be explained.

Regarding the above D3 of the number density of Al concentrated regions A3 near the interface, the present invention is characterized in that D3: 0.020 to 0.180/$\mu m^2$. If D3 is outside this range, the effect of improvement of the coating adhesion with respect to bending cannot be obtained.

Further, regarding the ratio of the areas of the anchoring Al regions A5 present in the anchoring oxide layer regions Al with respect to the Al concentrated regions A3, that is, S5/S3, the invention is characterized in that S5/S3≥0.33 (33%). If this ratio becomes less than 0.33, an effect of improvement of the coating adhesion with respect to bending cannot be obtained.

Furthermore, regarding the position H5 in the thickness direction of the anchoring Al regions A5, H5 is characterized by being 0.4 to 4.0 µm. If this value becomes less than 0.4 µm, it is not possible to obtain the effect of improvement of the coating adhesion with respect to bending. Further, the state where the value of H5 becomes over 4.0 µm means the anchoring oxide layer (2) itself becoming excessively thick. Oxides obstruct domain wall movement at the time of magnetization, so detrimental effects on the magnetic properties appear.

The reason why the above Al distribution affects the bendability is not clear, but is believed to be as follows:

Al is an element with a strong tendency to form oxides, so during finish annealing, at the surface of the steel sheet, Al is selectively oxidized and Al diffuses from the inside of the base steel sheet toward the surface. At this time, at the surface oxides, if part of the $Mg_2 SiO_4$ is reduced and $MgAl_2 O_4$ is formed, the final coating tension falls, the magnetic properties are degraded, and the surface oxide layer (1) mainly comprised of $Mg_2 SiO_4$ becomes uneven in thickness. To avoid this, one solution may be to make the Al oxidize inside of the steel sheet and prevent it from reaching the surface oxide layer (1). That is, the Al may be fixed in place by oxidation at the front end regions of the anchoring oxides deeply penetrating into the base steel sheet.

The present invention is structured with Al concentrated at the front end regions of the anchoring oxide layer (2). In the present invention, the state of the Al in the Al concentrated regions A3 is not prescribed at all, but the main constituent of the primary coating is $Mg_2 SiO_4$. If considering this, it is appropriate to consider that the Al in A3 is present as oxides. It is considered that this situation is caused so both enhancement of the magnetic properties and improvement of the coating adhesion with respect to bending can be achieved.

The prescribed value expressing this state is H5. If H5 is 0.4 μm or more, that is, if anchoring Al regions A5 are at the side inside of the steel sheet separated from H0 by 0.4 μm or more (front end sides of anchoring oxides), it may be considered that the above state has been reached.

Further, the fact that anchoring Al regions are at the front ends of the anchoring oxide layer (2) also leads to D3 being a value in a suitable range. That is, if the number density of the anchoring Al regions A5 is small and Al reaches the interface as a whole, D3 becomes low. Further, even if a situation temporarily arises where the density of the anchoring Al regions A5 becomes excessively high, the distance between adjacent anchoring Al regions A5 becomes shorter, so along with the growth of the primary coating, these end up joining. Finally, D3 becomes less likely to become an excessively high value. For this reason, the suitable range of D3 becomes 0.020 to 0.180/μm².

Further, if the above-mentioned suitable anchoring Al regions A5 are formed, the Al diffusing from the inside of the steel sheet no longer reaches the surface oxide layer, so S5/S3 inevitably becomes a high value and the 0.33 prescribed in the present invention can be considered to become the lower limit.

Characterizing Feature of Primary Coating/Existence of Anchoring Oxide Layer Regions In the primary coating of the present invention, it cannot be said that the anchoring oxides have remarkable characterizing features in terms of external shape, but the above-mentioned characterizing Al distribution utilizes phenomena at the front end regions of the anchoring oxide layer (2), so if the anchoring oxides themselves are not present, formation of the characterizing Al distribution also becomes difficult.

For this reason, the presence of anchoring oxides is prescribed and the ratio of the areas of anchoring oxide layer regions on the projection plane is prescribed. Note that, the numerical range itself of this provision is one of an extent observed even in grain-oriented electrical steel sheet excellent in coating adhesion in a general shearing operation, but can also be said to be important as an essential condition for obtaining the characterizing Al distribution.

In the present invention, it is necessary that (the area S1 of anchoring oxide layer regions)/(observed area S0)≥0.15 (15%). This value becoming less than 0.15 means that even if each single anchoring oxide is formed over a considerable area, the number density of the number of anchoring oxides is extremely low or even if the number density is a certain extent of value, the area of each single anchoring oxide is small. In either case, it expresses the state where the interval between the anchoring oxides becomes relatively broad. Under such a situation, the Al diffusing from the inside of the steel sheet reaches the surface oxide layer region, so it becomes difficult to form the above-mentioned characterizing Al distribution.

Characterizing Feature of Primary Coating/Composition of Primary Coating and Distribution of Ca Group Elements The primary coating of the present invention has $Mg_2SiO_4$ as a main constituent. More specifically, the primary coating contains 50 to 95 mass % of $Mg_2SiO_4$. The remaining part is mainly the generally known $MgAl_2O_4$ and other oxides or Mn or alkali earth metal sulfides.

Furthermore, the primary coating of the present invention contains Y group elements in a total of 0.1 to 6.0 mass % and Ca group elements in a total of 0.1 to 6.0 mass % with respect to the content of $Mg_2SiO_4$ in the primary coating.

Details will be explained later, but to realize the above-mentioned distribution of Al, it is preferable to use an annealing separator containing Y group elements. In this case, Y group elements remain in the primary coating after the finish annealing as well. If the total content of the Y group elements in the primary coating is less than 0.1 mass %, the coating adhesion with respect to bending is not improved. If over 6.0 mass %, the anchoring oxide layer (2) becomes too great in thickness, so the detrimental effects on the magnetic properties become remarkable.

In the same way, to realize the above-mentioned Al distribution, it is preferable to use an annealing separator containing Ca group elements. In this case, Ca group elements also remain in the primary coating after the finish annealing.

With a total content of Ca group elements in the primary coating of less than 0.1 mass %, it is not possible to raise the coating adhesion in a bending operation. With over 6.0 mass %, the number density of oxide particles of the anchoring oxide layer (2) becomes too high and the adjacent anchoring oxides join and form integral particles, so as a result the number density of the anchoring oxide particles falls. Not only that, the characterizing Al distribution cannot be obtained and the coating adhesion in a bending operation cannot be raised.

The content of $Mg_2SiO_4$ in the primary coating is obtained by using the primary coating separated from the electrical steel sheet by the above method as a sample and quantitatively analyzing the Mg in the sample by the induction coupling plasma mass spectrometry (ICP-MS). The product of the obtained quantized value (mass %) and the molecular weight of the $Mg_2SiO_4$ divided by two times the atomic weight of Mg is made the content of $Mg_2SiO_4$.

Further, in the same way, Ca, Ba, and Sr and La, Y, and Ce are quantitatively analyzed by a method similar to the above. The obtained contents (mass %) are calculated in the same way as the above to calculate the contents of these elements. The total of the obtained contents of Ca, Ba, and Sr is defined as the "content of Ca group elements" and the total of the obtained contents of La, Y, and Ce is defined as the "content of Y group elements".

Further, if the primary coating of the present invention contains Ca group elements, the "number density of the Ca group element concentrated regions" D4 on the projection plane is 0.008/μm² or more. Details will be explained later, but the Ca group elements which the annealing separator contains are believed to play an important role in controlling the number density of anchoring oxides in the process of formation of the primary coating. The number density D4 of the Ca group element concentrated regions at the primary coating prescribed here is believed to express the mode when Ca group elements acting to form anchoring oxides in the process of formation of the primary coating remain in the primary coating. If D4 becomes high, the Ca group elements are evenly supplied to the anchoring oxides, so the number density D3 of the Al-based oxides becomes higher and penetration of the anchoring oxides to the inside of the base steel material is promoted.

If D4 becomes less than 0.008/μm², the number density of the anchoring oxide particles cannot be sufficiently obtained and the adhesion is not improved. Not only that, the above characterizing Al distribution cannot be obtained.

If D4 is too high, the frequency of formation of the anchoring oxide particles formed in relation to this also becomes excessively high and, in the same way as the case where D3 is excessively high, the adjacent anchoring oxides join and form integral particles, so formation of the characterizing Al distribution is impaired. For this reason, D4 is $2.000/\mu m^2$ or less.

Method of Manufacture

One example of the method for manufacturing grain-oriented electrical steel sheet according to the present invention will be explained.

One example of the method for manufacturing grain-oriented electrical steel sheet is provided with a steelmaking process, hot rolling process, hot rolled sheet annealing process, cold rolling process, decarburization annealing process, annealing separator layer forming process, and finish annealing process. Below, the processes will be explained. Note that, the treatment conditions of the following processes are not off from the general ranges and do not have to be special ones. In the method of the present invention, the characterizing feature is the annealing separator covering the surface of the steel sheet before finish annealing for controlling the structure of the primary coating.

Steelmaking Process

In the steelmaking process, molten steel is produced by a blast furnace or other ordinary method and a known refining process and casting process are performed to manufacture a slab having the next chemical composition. Note that parts of the elements which the slab contains are discharged from the steel in the later explained decarburization annealing and finish annealing process. In particular, the C for controlling the primary recrystallization and the S, Al, N, etc. functioning as inhibitors are greatly removed. For this reason, the chemical composition of the slab differs from the chemical composition of the steel sheet of the final product.

C: 0.005 to 0.100 mass %

If the content of C is over 0.100 mass %, the time required for the decarburization annealing becomes longer. In this case, the manufacturing costs rise and the productivity falls. Therefore, the content of C in the slab is 0.100 mass % or less. The preferable upper limit of the content of C in the slab is 0.092 mass %, more preferably 0.085 mass %. Further, if the content of C is lower than 0.005 mass %, the state of dispersion of the MnS, MnSe, AlN, and other precipitates and also the particle structure of the steel sheet after the decarburization annealing will not become uniform and the degree of integration to the Goss orientation after secondary recrystallization may be degraded. Therefore, the lower limit of the content of C in the slab is 0.005 mass %. The preferable lower limit of the content of C in the slab is 0.020 mass %, more preferably 0.040 mass %.

Si: 2.5 to 4.5 mass %,

As explained in the section on the chemical composition of the grain-oriented electrical steel sheet of the finished product, Si raises the electrical resistance of steel, but if excessively present, the cold workability falls. If the content of Si in the slab is 2.5 to 4.5 mass %, the content of Si of the grain-oriented electrical steel sheet after the finish annealing process becomes 2.5 to 4.5 mass %. The preferable upper limit of the content of Si in the slab is 4.0%, more preferably 3.8 mass %. The preferable lower limit of the content of Si in the slab is 2.6 mass %, more preferably 2.8 mass %.

Mn: 0.02 to 0.20 mass %

As explained in the section on the chemical composition of the grain-oriented electrical steel sheet of the finished product, in the manufacturing process, Mn bonds with S and Se to form precipitates which function as inhibitors. Mn further raises the hot workability of steel. If the content of Mn in the slab is 0.02 to 0.20%, the Mn content of the grain-oriented electrical steel sheet after the finish annealing process becomes 0.02 to 0.20 mass %. The preferable upper limit of the content of Mn in the slab is 0.13 mass %, more preferably 0.10 mass %. The preferable lower limit of the content of Mn in the slab is 0.03 mass %, more preferably 0.04 mass %.

One or more elements selected from the group comprised of S and Se: total of 0.005 to 0.070 mass %

In the manufacturing process, sulfur (S) and selenium (Se) bond with Mn to form MnS and MnSe. MnS and MnSe both function as inhibitors required for suppressing crystal grain growth during secondary recrystallization. If the total content of the one or more elements selected from the group comprised of S and Se is less than 0.005 mass %, the above effect is hard to obtain. On the other hand, if the total content of the one or more elements selected from the group comprised of S and Se is over 0.070 mass %, in the manufacturing process, secondary recrystallization does not occur and the magnetic properties of the steel fall. Therefore, in the slab, the total content of the one or more elements selected from the group comprised of S and Se is 0.005 to 0.070 mass %. The preferable lower limit of the total content of the one or more elements selected from the group comprised of S and Se is 0.008 mass %, more preferably 0.016 mass %. The preferable upper limit of the total content of the one or more elements selected from the group comprised of S and Se is 0.060 mass %, more preferably 0.050 mass %.

Sol. Al: 0.005 to 0.050 mass %

In the manufacturing process, aluminum (Al) bonds with N to form AlN. AlN functions as an inhibitor. If the content of sol. Al in the slab is less than 0.005 mass % the above effect is not obtained. On the other hand, if the content of sol. Al in the slab is over 0.050 mass %, the AlN coarsens. In this case, it becomes difficult for the AlN to function as an inhibitor, and sometimes secondary recrystallization is not caused. Therefore, the content of sol. Al in the slab is 0.005 to 0.050 mass %. The preferable upper limit of the content of sol. Al in the slab is 0.040 mass %, more preferably 0.035 mass %. The preferable lower limit of the content of sol. Al in the slab is 0.010 mass %, more preferably 0.015 mass %.

N: 0.001 to 0.030 mass %

In the manufacturing process, nitrogen (N) bonds with Al to form AlN functioning as an inhibitor. If the content of N in the slab is less than 0.001 mass %, the above effect is not obtained. On the other hand, if the content of N in the slab is over 0.030 mass %, the AlN coarsens. In this case, it becomes difficult for the AlN to function as an inhibitor and sometimes secondary recrystallization is not caused. Therefore, the content of N in the slab is 0.001 to 0.030 mass %. The preferable upper limit of the content of N in the slab is 0.012 mass %, more preferably 0.010 mass %. The preferable lower limit of the content of N in the slab is 0.005 mass %, more preferably 0.006 mass %.

The balance of the chemical composition in the slab of the present invention is comprised of Fe and impurities. Here, "impurities" mean elements which enter from the ore used as the raw material, the scrap, or the manufacturing environment etc. when industrially manufacturing the slab and which are allowed to be contained in a range not having a detrimental effect on the slab of the present embodiment.

Regarding Optional Elements

The slab according to the present invention may further contain, in place of part of the Fe, one or more elements selected from the group comprising Cu, Sn, and Sb in a total of 0.60 mass % or less. Further, the slab according to the present invention may further contain, in place of part of the Fe, one or more elements selected from the group comprising Ca, Ba, and Sr in a total of 0.02 mass % or less. These elements are all optional elements.

One or more elements selected from group comprised of Cu, Sn and Sb: total of 0 to 0.6 mass %

Cu (copper), tin (Sn), and antimony (Sb) are all optional elements and need not be contained. If constituents included in the slab, Cu, Sn, and Sb all raise the magnetic flux density of grain-oriented electrical steel sheet. If Cu, Sn, and Sb are contained even a little, the above effect is obtained to a certain extent. However, if the contents of Cu, Sn, and Sb are over a total of 0.60 mass %, at the time of decarburization annealing, it becomes difficult for an internal oxide layer to be formed. In this case, at the time of the finish annealing, the formation of the primary coating, which proceeds with the reaction of MgO of the annealing separator and the $SiO_2$ of the internal oxide layer, is delayed. As a result, the adhesion of the primary coating formed falls. Further, after purification annealing, Sn and Sb easily remain as impurity elements. As a result, the magnetic properties deteriorate. Therefore, the content of one or more elements selected from the group comprised of Cu, Sn, and Sb is a total of 0 to 0.60 mass %. The preferable lower limit of the total content of one or more elements selected from the group comprised of Cu, Sn, and Sb is 0.005 mass %, more preferably 0.007 mass %. The preferable upper limit of the total content of one or more elements selected from the group comprised of Cu, Sn, and Sb is 0.50 mass %, more preferably 0.45 mass %.

The slab according to the present invention may further contain, in place of part of the Fe, one or more elements selected from the group comprised of Bi, Te, and Pb in a total of 0.030 mass % or less. These elements are all optional elements.

One or more elements selected from group comprised of Bi, Te, and Pb: total of 0 to 0.030 mass %

Bismuth (Bi), tellurium (Te), and lead (Pb) are all optional elements, but are elements which should be taken note of in the present invention.

These elements raise the magnetic flux density of grain-oriented electrical steel sheet. The preferable lower limit value of the total content of the one or more elements selected from the group comprised of Bi, Te, and Pb for this is 0.0005 mass %, more preferably 0.0010 mass %.

On the other hand, if, at the time of the finish annealing, these elements segregate at the surface, the anchoring oxide layer (2) will not become thicker, and coating adhesion of the primary coating will fall. For this reason, despite having the effect of raising the magnetic flux density, for securing the coating adhesion, the amount of addition had to be limited to 0.030 mass % or so or less. The effect of the present invention becomes particularly effective when changing the structure of the anchoring oxides to improve the coating adhesion, so becomes particularly effective if applying the method of manufacture containing these elements. In the case of application of the present invention, excellent coating adhesion becomes able to be secured even by these elements in 0.010 mass % or more, more preferably 0.015 mass % or more. This being said, if excessively containing this, it is not possible to avoid a drop in adhesion even by the effect of the present invention. Further, if not able to be discharged from the system even by purification at the time of the finish annealing and ending up remaining in the base steel sheet, the magnetic properties will be made to be degraded, so the upper limit is made 0.0300 mass %. The preferable upper limit is 0.0200 mass %, while the more preferable upper limit is 0.0150 mass %.

Hot Rolling Process

The slab having the above-mentioned chemical composition is heated. The heating temperature of the slab is, for example, over 1280° C. to 1350° C. or less. The heated slab is hot rolled to manufacture the hot rolled steel sheet. The hot rolled steel sheet is annealed as required.

Cold Rolling Process

In the cold rolling process, hot rolled steel sheet is cold rolled to manufacture cold rolled steel sheet.

The prepared hot rolled steel sheet is cold rolled to produce the cold rolled steel sheet of the base steel sheet. The cold rolling may be performed only one time or may be performed several times. If performing cold rolling several times, after performing cold rolling, process annealing is performed for purpose of softening the steel, then cold rolling is performed. By performing cold rolling one time or several times, cold rolled steel sheet having the finished product thickness (thickness of finished product) is manufactured.

The cold rolling rate in the one time or several times of cold rolling is 80% or more. Here, the cold rolling rate (%) is defined as follows:

Cold rolling rate (%)={1−(thickness of cold rolled steel sheet after final cold rolling)/(thickness of hot rolled steel sheet before start of initial cold rolling)}×100

Note that, the preferable upper limit of the cold rolling rate is 95%. Further, before cold rolling the hot rolled steel sheet, the hot rolled steel sheet may be heat treated or may be pickled.

Decarburization Annealing Process

The cold rolled steel sheet manufactured by the cold rolling process is decarburization annealed and nitridation annealed in accordance with need. The decarburization annealing is performed in a known hydrogen-nitrogen wet atmosphere. Due to the decarburization annealing, the concentration of C of the grain-oriented electrical steel sheet is decreased to the 50 ppm or less level able to suppress magnetic aging deterioration. In the decarburization annealing process, simultaneously primary recrystallization occurs and the working strain introduced by the cold rolling is released. Furthermore, in the decarburization annealing process, the surface layer part of the base steel sheet is formed with an internal oxide layer having $SiO_2$ as its main constituent. The $SiO_2$ formed here reacts with the MgO in the aqueous slurry containing the annealing separator to be coated later during the finish annealing to form a primary coating controlled in form in the present invention. The conditions of the decarburization annealing process are known. For example, the peak temperature is 750 to 950° C. The holding time at that temperature is for example 1 to 5 minutes.

Annealing Separator Layer Forming Process

In the present invention, the "annealing separator" indicates a substance having as its main objective the prevention of sticking of steel sheets during finish annealing and covers the surface of the decarburization annealed steel sheet on which the finish annealing is to be performed.

In this process, an aqueous slurry containing the compounds forming the annealing separator etc. is prepared. The aqueous slurry is prepared by mixing and stirring the compounds containing the elements forming the annealing separator etc. with water. This slurry is coated on the surface of the above decarburization annealed sheet by a roll coater, spray, etc. The steel sheet on which the slurry is coated is inserted into a furnace held at 400 to 1000° C. and held there for 10 to 90 seconds to thereby dry the slurry of the surface. Note that, at this time, the temperature of the steel sheet itself only rises to 400° C. or so. For this reason, in the steel sheet, no grain growth or other remarkable change in the crystal structure occurs. Further, in the slurry, the moisture evaporates and is discharged and part of the contained elements reacts with the water to form compounds containing oxygen. Here, the decarburization annealed sheet covered with the annealing separator will be referred to as the "finish annealing-use steel sheet".

Basically, finally, the annealing separator covering the surface of the steel sheet before the finish annealing may be considered to be obtained by simply mixing the various compounds etc. used as the raw materials.

Finish Annealing Process

The annealing separator is dried, then the finish annealing is performed. In the finish annealing, the annealing temperature is made 1150 to 1250° C. and the decarburization annealed sheet covered by the annealing separator is annealed. The soaking time is for example 15 to 30 hours. The furnace atmosphere in the finish annealing is a known atmosphere. Note that, in the final process of the finish annealing process, in particular, parts of the S, Al, N, and other elements functioning as inhibitors are discharged to outside the system. This process is sometimes called "purification (annealing)".

In the grain-oriented electrical steel sheet manufactured by the above manufacturing process, a primary coating having $Mg_2 SiO_4$ as a main constituent is formed on the surface. At this time, by applying the later explained annealing separator, the result becomes a grain-oriented electrical steel sheet of the present invention with an interfacial structure of the base steel sheet and the primary coating satisfying the provisions of the invention and the coating adhesion is improved.

Insulating Coating Forming Process

The grain-oriented electrical steel sheet according to the present invention may further be subjected to a process for formation of an insulating coating after the above finish annealing process. In the process for formation of an insulating coating, the surface of the grain-oriented electrical steel sheet after the finish annealing is coated with a known insulating coating agent mainly comprised of colloidal silica and a phosphate, then baked. These treatments do not impair the effects of the present invention. An insulating coating having the function of imparting tension to the steel sheet is formed on the primary coating.

Magnetic Domain Refining Treatment Process

The grain-oriented electrical steel sheet according to the present invention may furthermore be subjected to a known process of treatment for refining the magnetic domains after the cold rolling, after the decarburization annealing, after the finish annealing, after the formation of the insulating costing, etc. In the process for refining the magnetic domains, the surface of the grain-oriented electrical steel sheet is given strain by firing a laser, by rolling by a roll with projecting parts, etc. or the surface is formed with grooves by firing a laser, etching, etc. These treatments do not impair the effect of the present invention and can be expected to improve the magnetic properties.

Annealing Separator

The annealing separator of the present invention has magnesium oxide (MgO) as its main constituent and further contains one or more elements selected from a group comprising Y, La, and Ce (Y group elements) and one or more elements selected from a group comprising Ca, Sr, and Ba (Ca group elements).

Y, La, and Ce

The ratios of the contents of Y, La, Ce, and Mg with respect to the content of MgO in the annealing separator are expressed by mass % and designated as [Y], [La], [Ce], and [Mg]. The annealing separator contains these elements in ranges satisfying the following formula:

$$(0.253[Y]+0.180[La]+0.170[Ce])/0.454[Mg]=0.40 \text{ to } 0.360.$$

Below, $(0.253[Y]+0.180[La]+0.170[Ce])/0.454[Mg]$ will sometimes be referred to as "CY".

Here the coefficients in the above formula are coefficients calculated in the belief that the Y, La, and Ce atoms present in the annealing separator are respectively contained as the stable oxides $Y_2 O_3$, $La_2 O_3$, $CeO_2$ and MgO and can be calculated as follows:

Coefficient of Y: Molecular weight of $Y_2 O_3$/density of $Y_2 O_3$/atomic weight of Y=225.8/5.01/88.9/2=0.253

Coefficient of La: Molecular weight of $La_2 O_3$/density of $La_2 O_3$/atomic weight of La/2=325.8/6.51/138.9/2=0.180

Coefficient of Ce: Molecular weight of $CeO_2$/density of $CeO_2$/atomic weight of Ce=172.1/7.22/140.1=0.170

Coefficient of Mg: Molecular weight of MgO/density of MgO/atomic weight of Mg=40.3/3.65/24.3=0.454

CY is the volume ratio of the content obtained by converting the Y group elements in the annealing separator as stable oxides of the elements and totaling them up and the MgO of the main constituent substance of the annealing separator. In other words, it can also be said to be an indicator expressing the magnitude of the effect of the Y group elements on Mg in oxides.

Note that, particles containing Y group elements can be made to contain Y group elements alone, as alloys, or as compounds, but preferably are made to contain them as compounds containing oxygen or as substances oxidizing during finish annealing to change to compounds containing oxygen. Compounds containing oxygen are for example oxides, hydroxides, carbonates, sulfates, etc. These may be obtained by mixing raw materials in advance of course and, for example, may obtained by changing to compounds containing oxygen in the drying process of the above-mentioned process of formation of the annealing separator layer.

If the annealing separator contains Y group elements, the anchoring oxide layer (2) becomes thicker and the adhesion of the primary coating with respect to the base steel sheet rises. If CY is less than 0.40, this effect is not sufficiently obtained. On the other hand, if CY is over 0.360, the anchoring oxide layer (2) becomes excessively thick and the magnetic properties fall. Therefore, CY is 0.40 to 3.60. The preferable lower limit of CY is 0.80, more preferably 1.20. The preferable upper limit is 3.20, more preferably 2.80.

The reason why controlling the content of Y group elements enables the thickness of the anchoring oxide layer (2) to be controlled is not clear, but is believed to be as follows:

The Y group elements are sometimes present as compounds containing oxygen as the annealing separator in the initial process (relatively low temperature) of the finish annealing, but even when not, react with the oxygen in the annealing separator to be present as compounds containing oxygen. Further, in the intermediate process where the primary coating is formed (where $Mg_2 SiO_4$ starts to be formed), the compounds decompose and release oxygen.

For the anchoring oxide layer (2) to penetrate to the inside of the base steel sheet, it is necessary that a sufficient amount of Mg be diffused and supplied from the annealing separator side to the $SiO_2$ at a deep position of the internal oxide layer formed in the decarburization annealing, but the finish annealing is performed in a high temperature and hydrogen atmosphere, so if oxygen becomes insufficient, the $SiO_2$ becoming unstable and ends up decomposing.

At this time, the Y group element compounds containing oxygen decompose and release oxygen thereby delaying the breakdown of $SiO_2$ and can maintain the formation of $SiO_2$ until Mg reaches it. $Mg_2 SiO_4$ is an oxide stable even in the high temperature and hydrogen atmosphere of the finish annealing. As a result, a thick anchoring oxide layer (2) is formed.

Ca, Sr, and Ba

The ratios of the contents of Ca, Sr, Ba, and Mg with respect to the content of MgO in the annealing separator are expressed by mass % and designated as [Ca], [Sr], [Ba], and [Mg]. The annealing separator contains these elements in exactly amounts satisfying the following formula:

$$(0.353[Ca]+0.252[Sr]+0.195[Ba])/0.454[Mg] \approx 0.20 \text{ to } 2.20$$

Below, $(0.353[Ca]+0.252[Sr]+0.195[Ba])/0.454[Mg]$ will sometimes be referred to as "CC".

Here the coefficients in the above formula are coefficients calculated in the belief that the Ca, Ba, Sr, and Mg atoms present in the annealing separator are respectively contained as the stable oxides CaO, BaO, SrO, and MgO and can be calculated as follows:

Coefficient of Ca: Molecular weight of CaO/density of CaO/molecular weight of Ca=56.1/3.96/40.1=0.353

Coefficient of Sr: Molecular weight of SrO/density of SrO/atomic weight of Sr=103.6/3.96/87.6=0.252

Coefficient of Ba: Molecular weight of BaO/density of BaO/atomic weight of Ba=153.3/4.7/137.3=0.195

Coefficient of Mg: Molecular weight of MgO/density of MgO/atomic weight of Mg=40.3/3.65/24.3=0.454

CC is the volume ratio of the content obtained by converting the Ca group elements in the annealing separator and totaling them up as stable oxides of the elements and the MgO of the main constituent substance of the annealing separator. In other words, it can also be said to be an indicator expressing the magnitude of the effect of the Ca group elements on Mg in oxides.

Note that, the particles containing the Ca group elements can be made to contain the Ca group elements alone, as alloys, or as compounds, but preferably are made to be contained as compounds containing oxygen or as substances changing to compounds containing oxygen by oxidation during the finish annealing. The compounds containing oxygen are for example oxides, hydroxides, carbonates, sulfates, etc. These are mixed in advance as raw materials of course, but may also for example be made to change to compounds containing oxygen in the drying process of the above-mentioned process for forming the annealing separator.

The Ca group elements are believed to react with the $SiO_2$ present at the surface region of the base steel sheet as starting points for formation of the primary coating so make formation of anchoring oxides easier, that is, for making the number density of the anchoring oxide layer regions increase.

The reason why such an action is exhibited is not clear, but is believed to be as follows.

For formation of anchoring oxide layer (2), the $SiO_2$ formed at a deep region from the surface of the base steel sheet and the Mg supplied from the annealing separator must be made to react, as explained above.

Ca group elements have actions similar to Mg, but if comparing the speeds of diffusion of Mg and Ca group elements in $SiO_2$, Ca group elements are faster, so if Ca group elements are present in the annealing separator, composite oxides of $SiO_2$ and Ca group elements are formed in regions inside of the base steel sheet earlier than the $Mg_2 SiO_4$ of the composite oxide of $SiO_2$ and Mg and a state where anchoring oxides penetrate inside the steel sheet stabilizes at an earlier timing. At this point of time, the anchoring oxides are mainly composite oxides of Ca and Si, but after that, the later arriving Mg forms stabler oxides than Ca, so the composition of the oxides gradually changes and finally is replaced with the $Mg_2 SiO_4$ of the main constituent substance of the primary coating. In this way, the annealing separator containing the Ca group elements makes the number density of the anchoring oxide layer regions of the primary coating increase.

Note that, the Ca group elements discharged from the oxides by substitution with Mg are believed to bond with the S in the base steel sheet and form sulfides. The Ca remaining in the primary coating in the end in the process is observed as Ca group elements contained in the above-mentioned primary coating and the number density D4 of Ca group element concentrated regions.

If CC is less 0.20, the above effect cannot be sufficiently obtained. On the other hand, if CC is over 2.20, the number density becomes excessively high in the initial process of the formation of the anchoring oxides, domain wall movement is obstructed, and the iron loss deteriorates. If CC is 0.20 to 2.20, deterioration of the iron loss can be suppressed while adhesion of a primary coating to a base steel sheet can be raised.

Optional Constituents of Annealing Separator

The annealing separator may further contain, in accordance with need, Ti, Zr, and Hf After this, the one or more elements selected from the group comprised of Ti, Zr, and Hf will sometimes be described as the "Ti group elements".

The ratios of contents of Ti, Zr, Hf, and Mg with respect to the content of MgO in the annealing separator are expressed by mass % and designated as [Ti], [Zr], [Hf], and [Mg]. The annealing separator contains these elements in exactly the amounts satisfying the following formula:

$$(0.370[Ti]+0.238[Zr]+0.122[Hf])/0.454[Mg]<6.50.$$

Below, $(0.370[Ti]+0.238[Zr]+0.122[Hf])/0.454[Mg]$ will sometimes be referred to as "CT".

Here, the coefficients in the above formula are coefficients calculated thinking of the Ti, Zr, Hf, and Mg atoms present in the annealing separator being respectively contained as the stable oxides $TiO_2$, $ZrO_2$, $HfO_2$, and MgO and can be calculated as follows:

Coefficient of Ti: (Molecular weight of $TiO_2$/density of $TiO_2$/atomic weight of Ti)=79.9/4.506/47.9=0.370

Coefficient of Zr: (Molecular weight of $ZrO_2$/density of $ZrO_2$/atomic weight of Zr)=91.2/5.68/123.2=0.238

Coefficient of Hf: (Molecular weight of $HfO_2$/density of $HfO_2$/atomic weight of Hf)=210.5/9.68/178.5=0.122

Coefficient of Mg: Molecular weight of MgO/atomic weight of Mg=40.3/24.3=0.454

CT is the volume ratio between the content of Ca group elements in the annealing separator converted and totaled as stable oxides of the elements and the MgO of the main constituent substance in the annealing separator. In other words, it can also be said to be an indicator showing the magnitude of the effect of the Ca group elements with respect to the Mg in the oxides.

The particles containing the Ti group elements can be made to contain the Ti group elements alone, as alloys, or as compounds. The compounds are for example sulfates, carbonates, hydroxides, etc.

In the finish annealing, the Ti group elements promote the reaction of the MgO in the annealing separator and the $SiO_2$ of the surface layer of the base steel sheet formed by the decarburization annealing and promote formation of $Mg_2SiO_4$. On the other hand, if CT is over 6.50, the effect becomes saturated and may become a cause of deterioration of the iron loss due to excessive development of the coating.

Furthermore, the annealing separator can also contain elements with known effects in ranges not obstructing the effect of the present invention.

The values of the above CY, CC, and CT are found from the contents of the group elements and content of Mg in the annealing separator.

Diffusion of Elements in Annealing Separator

The annealing separator of the present invention contains the various elements explained above, but these are present not only as single metals, but also in the state mixed as various types of compounds.

In the present invention, this mixed state will be prescribed in several ways.

In the annealing separator of the present invention, the mean particle size of MgO is 0.08 to 1.50 μm. Below, the mean particle size of MgO will be referred to as "R1". If R1 is less than 0.08 μm, contact of the coil between sheets of the coil during the finish annealing can no longer be sufficiently avoided and the function as an annealing separator is impaired, so sticking occurs between sheets of the coil. If R1 is over 1.50 μm, the contact area of the MgO and $SiO_2$ during the formation of the primary coating falls. Also, MgO itself is inert, so reaction becomes difficult and the formation of the primary coating becomes delayed, so the coating adhesion becomes poor.

The annealing separator of the present invention has a mean particle size of particles containing Ca group elements of 0.08 to 1.50 μm. Below, the mean particle size of particles containing Ca group elements will be referred to as "R2".

If R2 is less than 0.08 μm, since the Ca group elements are active, the amount of supply of Ca group elements to the primary coating during formation becomes too great compared with the amount of supply of Mg. For this reason, formation of $Mg_2SiO_4$ is obstructed and the adhesion of the primary coating deteriorates.

Further, if R2 is a large one of over 1.50 μm, the frequency of contact of MgO and $SiO_2$ falls and the supply of Mg to the primary coating formed becomes insufficient. For this reason, the formation of $Mg_2SiO_4$ becomes delayed and the adhesion of the primary coating deteriorates.

Further, the annealing separator of the present invention has the above ratio of R2 to R1, that is, R2/R1, within a range of 0.3 to 3.0.

If R2/R1 becomes less than 0.3, the ratio (S3/S5) of the anchoring Al regions A5 of the primary coating formed falls and the coating adhesion deteriorates. Accordingly, the lower limit of R2/R1 is preferably 0.5 or more, more preferably 0.8 or more.

On the other hand, even if R2/R1 becomes over 3.0, the number density D3 of Al concentrated regions of the primary coating formed falls to less than 0.020 and the coating adhesion deteriorates. Accordingly, the upper limit of R2/R1 is preferably 2.6 or less, more preferably 2.2 or less.

The reason which the coating adhesion is improved by the above R1, R2 and R2/R1 is not clear, but may be as follows:

In general, the smaller the powder, the easier it becomes for it to aggregate. If mixing powder compounds with greatly different particle sizes, the fine compounds aggregate. If considering the mixed state of MgO and the Ca group elements, if the compounds of the Ca group elements are excessively fine and R2/R1 becomes less than 0.3, the compounds of the Ca group elements aggregate. If making such a mixture deposit on the surface of the base steel sheet, in the state of contact with the base steel sheet, regions in which only the Ca group elements contact the base steel sheet will be present as regions of considerable size. In the same way, if R2/R1 becomes over 3.0, the MgO will aggregate and regions in which the Ca group elements and the base steel sheet do not contact each other much at all will be present as regions of considerable size.

If the primary coating continues to be formed in the finish annealing in this state, a great difference will arise in speed of formation of anchoring oxides between regions in which only the Ca group elements contact the base steel sheet and regions in which only MgO contacts it and the interface will end up becoming extremely uneven in structure. This unevenness causes a drop in the adhesion of the coating due to stress concentration at the time of a bending operation.

Below, the method of measurement of the prescribed values relating to the above-mentioned "dispersion of elements of annealing separator" will be explained.

R1 and R2 are measured in the following way. That is, the raw material powder is measured by the laser diffraction/scattering method based on JIS Z8825 (2013) using a laser diffraction/scattering type particle size distribution measuring device (LA-700 made by Horiba Corporation) to obtain the particle size distribution based on volume. Furthermore, this is converted to particle size distribution based on the number of particles and finally the mean particle size based on the number of particles is found for each raw material powder.

What required note is that the R1 and R2 prescribed in the present invention are values calculated based on the numbers of particles.

In general, the mean particle size of particles is often prescribed based on weight. If based on weight, in powder with uneven particle sizes, the ratio of presence of particles in a specific range of particle size is expressed by a ratio in the total weight. This mean particle size based on weight is characterized by the mean particle size obtained greatly fluctuating if the ratio of presence of coarse particles which cannot serve as representative particles of the measured object as a whole in the distribution of particle size, for example, with an extremely small frequency of presence, changes even slightly since the ratio of coarse particles as weight in the whole is large.

On the other hand, the mean particle size based on the number of particles prescribed in the present invention is based on the number of particles present classified by size, so if the numbers of particles of specific sizes do not greatly change, the overall mean particle size will not greatly fluctuate. That is, the size becomes a value reflecting the particle size of particles with high frequency of presence. This value, in other words, has a strong correlation with the number of particles per unit volume.

The effect of the present invention, as explained up to here, is exhibited by the presence of particles in the annealing separator in a suitable size so that in the diffusion of the elements in the annealing separator, in particular the diffusion of the Ca group elements, the regions where the Ca group elements concentrate in the primary coating formed do not occupy an unsuitably large area. For this reason, while small in frequency, the particle size has to be prescribed by the mean particle size not based on weight, but based on the number of particles so as to be able to eliminate the effects of coarse particles.

Manufacture of Grain-Oriented Electrical Steel Sheet

Molten steel having each of the chemical compositions shown in Table 1 was produced by a vacuum melting furnace. Continuous casting was used to manufacture a slab.

TABLE 1

| Molten steel no. | C | Si | Mn | S | Se | Sol. Al | N | Cu | Sn | Sb | Bi | Te | Pb |
|---|---|---|---|---|---|---|---|---|---|---|---|---|---|
| 1 | 0.077 | 3.2 | 0.08 | 0.025 | — | 0.025 | 0.008 | — | — | — | — | — | — |
| 2 | 0.078 | 3.2 | 0.08 | — | 0.020 | 0.024 | 0.008 | — | — | — | — | — | — |
| 3 | 0.121 | 3.2 | 0.08 | 0.023 | — | 0.024 | 0.008 | — | — | — | — | — | — |
| 4 | 0.078 | 2.0 | 0.08 | 0.025 | — | 0.024 | 0.008 | — | — | — | — | — | — |
| 5 | 0.078 | 4.2 | 0.08 | 0.025 | — | 0.024 | 0.008 | — | — | — | — | — | — |
| 6 | 0.077 | 3.2 | 0.02 | 0.024 | — | 0.024 | 0.008 | — | — | — | — | — | — |
| 7 | 0.078 | 3.2 | 0.3 | 0.025 | — | 0.025 | 0.008 | — | — | — | — | — | — |
| 8 | 0.078 | 3.2 | 0.08 | 0.003 | — | 0.024 | 0.008 | — | — | — | — | — | — |
| 9 | 0.077 | 3.2 | 0.08 | 0.002 | 0.003 | 0.024 | 0.008 | — | — | — | — | — | — |
| 10 | 0.077 | 3.2 | 0.08 | 0.010 | 0.005 | 0.024 | 0.008 | — | — | — | — | — | — |
| 11 | 0.078 | 3.2 | 0.08 | 0.060 | — | 0.024 | 0.008 | — | — | — | — | — | — |
| 12 | 0.078 | 3.2 | 0.08 | 0.025 | 0.010 | 0.002 | 0.008 | — | — | — | — | — | — |
| 13 | 0.078 | 3.2 | 0.08 | 0.024 | 0.015 | 0.060 | 0.008 | — | — | — | — | — | — |
| 14 | 0.077 | 3.2 | 0.08 | 0.025 | 0.013 | 0.024 | 0.002 | — | — | — | — | — | — |
| 15 | 0.078 | 3.2 | 0.08 | 0.023 | 0.014 | 0.026 | 0.033 | — | — | — | — | — | — |
| 16 | 0.078 | 3.2 | 0.08 | 0.025 | 0.010 | 0.024 | 0.008 | 0.10 | — | — | — | — | — |
| 17 | 0.077 | 3.2 | 0.08 | 0.025 | 0.025 | 0.024 | 0.008 | 0.50 | — | — | — | — | — |
| 18 | 0.078 | 3.2 | 0.08 | 0.025 | — | 0.024 | 0.008 | 0.10 | 0.07 | — | — | — | — |
| 19 | 0.078 | 3.2 | 0.08 | 0.02 | 0.010 | 0.025 | 0.008 | 0.10 | — | 0.07 | — | — | — |
| 20 | 0.078 | 3.2 | 0.08 | 0.018 | 0.010 | 0.024 | 0.008 | 0.10 | 0.03 | 0.02 | — | — | — |
| 21 | 0.078 | 3.2 | 0.08 | 0.024 | 0.025 | 0.024 | 0.008 | 0.10 | 0.40 | — | — | — | — |
| 22 | 0.076 | 3.2 | 0.08 | 0.022 | 0.010 | 0.024 | 0.008 | 0.10 | 0.08 | — | 0.0025 | — | — |
| 23 | 0.078 | 3.2 | 0.08 | 0.02 | 0.010 | 0.025 | 0.008 | 0.10 | 0.08 | — | 0.0060 | 0.005 | — |
| 24 | 0.077 | 3.2 | 0.08 | 0.02 | 0.010 | 0.024 | 0.008 | 0.10 | 0.08 | — | 0.0060 | — | 0.005 |
| 25 | 0.078 | 3.2 | 0.08 | 0.025 | 0.025 | 0.024 | 0.008 | 0.10 | 0.08 | — | 0.0200 | 0.005 | 0.006 |

The features of the diffusion of elements provided by the annealing separator are as explained above, but among these, to control the state of diffusion of Ca group elements in the primary coating formed, it is necessary to make the number densities of the particles in the raw material powder suitable ones. This state can be expressed by the number density of particles containing Ca group elements in the raw material powder ≥25,000,000,000/cm³. For raw material powder containing the Ca group elements used for the annealing separator of the present invention, even among commercially available products, the above range is kept in mind and raw materials controlled so that the distribution of particle sizes remains within the fine range are used.

The number densities of particles in the raw material powder were measured using a laser diffraction particle size distribution measuring device (LA-700) made by Horiba.

EXAMPLES

Below, modes of the present invention will be explained more specifically by examples. These examples are just illustrations for confirming the effects of the present invention and do not limit the present invention.

The present invention relates to an annealing separator having an important role in formation of the primary coating and covering the steel sheet before finish annealing and to a primary coating formed by the same. The base steel sheet does not have to be a special one. For this reason, in the examples, the steel sheet was manufactured under constant conditions (hot rolling, cold rolling, and annealing conditions etc.) not having a direct relationship with the effects of the invention. First, the common conditions in the examples as a whole will be explained, then the results of study of the effects of the invention by changing the conditions relating to the primary coating in Examples 1 and 2 will be explained.

Each slab of Table 1 heated at 1350° C. was rolled hot to manufacture hot rolled steel sheet having a thickness of 2.3 mm. In Molten Steel No. 5, the content of Si in the molten steel was too great, so cracks occurred at the time of hot rolling and hot rolled steel sheet could not be manufactured.

The obtained hot rolled steel sheet was annealed as hot rolled and was pickled. The hot rolling annealing was performed at 1100° C. for 5 minutes.

The hot rolled steel sheet after the pickling was cold rolled to manufacture cold rolled steel sheet having a thickness of 0.22 mm. The cold rolling rate was 90.4%.

The cold rolled steel sheet was annealed by primary recrystallization annealing doubling as decarburization annealing. The peak temperature was 750 to 950° C. and the holding time at the peak temperature was 2 minutes.

Next, the decarburization annealed steel sheet was coated with an aqueous slurry and was held in a 900° C. furnace for 10 seconds to dry the aqueous slurry. The aqueous slurry contained the materials of the annealing separator.

Note that, in the preparation of the aqueous slurry containing the compounds etc. forming the annealing separator, in the case of using a compound containing Ca group elements for a constituent of the annealing separator, compounds in a case satisfying the number density of the Ca group element containing particles≥25,000,000,000/cm³ and a case not satisfying it were used. The number density of the Ca group containing particles was calculated by measuring the particle size distribution of raw material powder containing all of the Ca group containing particles used as the raw material powder of the aqueous slurry using a laser diffraction particle size distribution measuring device. When using raw material powder containing two or more types of Ca group containing particles, it was measured mixing them to give ratios of them becoming the same as the ratios in the slurry.

Furthermore, final annealing was performed holding the steel sheet at 1200° C. for 20 hours. Due to the above manufacturing process, a grain-oriented electrical steel sheet comprised of a base steel sheet and a primary coating was manufactured. The chemical composition of the base steel sheet of the grain-oriented electrical steel sheet manufactured is shown in Table 2.

In Molten Steel No. 3, the content of C was too great, the value of the iron loss after secondary recrystallization greatly deteriorated, and the result became outside the scope of the present invention. In Molten Steel No. 4, the content of Si was too small and secondary recrystallization did not occur, so the magnetic flux density B8 and the value of the iron loss greatly deteriorated and the result became outside the scope of the present invention.

In Molten Steel Nos. 6, 7, 8, 9, 10, 11, 12, 13, 14, and 15, the content of Mn, S, Se, sol. Al, or N was outside the range of suitable amount for forming the precipitates required for realizing secondary recrystallization and no secondary recrystallization occurred, so as a result, the magnetic flux density B8 and the value of the iron loss greatly deteriorated and the result became outside the scope of the present invention.

In Molten Steel No. 17, the content of Cu was too great, the coating adhesion became extremely poor, and the result became outside the scope of the present invention.

In Molten Steel No. 21, the content of Sn was too great, the coating adhesion became poor, and the result became outside the scope of the present invention.

In Molten Steel No. 25, the total content of Bi, Te, and Pb was too great, the coating adhesion became poor, and the result became outside the scope of the present invention.

In the above manufacturing, in the same way as general grain-oriented electrical steel sheet, by performing decarburization annealing or finish annealing (purification annealing), the composition of the base steel sheet becomes different from the slab of the base material.

Evaluation of Properties

In Steel Sheet Nos. 1, 2, 16, 18, 19, 20, 22, 23, 24, and 25 where the constituents of the steel sheet were in the scope of the present invention, the magnetic properties of the grain-oriented electrical steel sheet manufactured and the adhesion of the primary coating were evaluated as Test Nos. 1 to 44.

Magnetic Properties

From each of the grain-oriented electrical steel sheets of the numbered tests, a sample of a rolling direction length of 300 mm×width 60 mm was taken. The sample was subjected to a magnetic field of 800 A/m to find the magnetic flux density B8. Further, an insulating coating having colloidal silica and a phosphate as main constituents was baked on, then the iron loss $W_{17/50}$ at the time of a magnetization by a magnetic flux density 1.7T and frequency 50 Hz was measured. Grain-oriented electrical steel sheet with a magnetic flux density B8 of 1.92T or more and a $W_{17/50}$ of 0.85 W/kg or less was deemed excellent in magnetic properties. Note that, these reference values take into consideration the composition of the steel sheet of the present example (mainly Si: 3.25 mass %) and thickness (base steel sheet of 0.22 mm). If the composition of the steel sheet or the sheet thickness differs, the reference values for judging passing/failing naturally will also differ.

Adhesion

A sample of a rolling direction length of 60 mm×width 15 mm was taken from each of the grain-oriented electrical steel sheets of the numbered tests. The sample was subjected to a flex test by a curvature of 10 mm. The flex test was performed using a cylindrical mandrel flex testing machine while setting it at the sample so that the axial direction of the cylinder matched the width direction of the sample. The surface of the sample after the flex test was examined and the length in the rolling direction of the peeled off part of the worked region was measured from a position of 1 mm from the edge in the width direction at 1 mm intervals in 13 levels. The maximum length $L_S$ among these was identified. Further, the ratio of $L_S$ in the total length L of the worked part (about 15.7 mm) was calculated and the adhesion was

TABLE 2

| Steel sheet no. | C | Si | Mn | S | Se | Sol. Al | N | Cu | Sn | Sb | Bi | Te | Pb | Remarks |
|---|---|---|---|---|---|---|---|---|---|---|---|---|---|---|
| 1 | 0.0005 | 3.2 | 0.08 | 0.001 | <0.0005 | 0.001 | 0.003 | <0.0005 | <0.0005 | <0.0005 | <0.0005 | <0.0005 | <0.0005 | Inv. ex. |
| 2 | 0.0005 | 3.2 | 0.08 | <0.0005 | 0.001 | 0.001 | 0.003 | <0.0005 | <0.0005 | <0.0005 | <0.0005 | <0.0005 | <0.0005 | Inv. ex. |
| 3 | 0.0180 | 3.2 | 0.08 | 0.001 | <0.0005 | 0.001 | 0.002 | <0.0005 | <0.0005 | <0.0005 | <0.0005 | <0.0005 | <0.0005 | Comp. ex. |
| 4 | 0.0005 | 1.9 | 0.08 | 0.001 | <0.0006 | 0.001 | 0.002 | <0.0005 | <0.0005 | <0.0005 | <0.0005 | <0.0005 | <0.0005 | Comp. ex. |
| 5 | 0.0005 | 3.2 | 0.02 | 0.001 | <0.0007 | 0.001 | 0.003 | <0.0005 | <0.0005 | <0.0005 | <0.0005 | <0.0005 | <0.0005 | Comp. ex. |
| 6 | 0.0005 | 3.2 | 0.3 | 0.001 | <0.0008 | 0.001 | 0.002 | <0.0005 | <0.0005 | <0.0005 | <0.0005 | <0.0005 | <0.0005 | Comp. ex. |
| 7 | 0.0005 | 3.2 | 0.08 | <0.0005 | <0.0009 | 0.002 | 0.003 | <0.0005 | <0.0005 | <0.0005 | <0.0005 | <0.0005 | <0.0005 | Comp. ex. |
| 8 | 0.0005 | 3.2 | 0.08 | <0.0005 | 0.003 | 0.002 | 0.003 | <0.0005 | <0.0005 | <0.0005 | <0.0005 | <0.0005 | <0.0005 | Comp. ex. |
| 9 | 0.0005 | 3.2 | 0.08 | 0.001 | 0.005 | 0.001 | 0.003 | <0.0005 | <0.0005 | <0.0005 | <0.0005 | <0.0005 | <0.0005 | Comp. ex. |
| 10 | 0.0005 | 3.2 | 0.08 | 0.005 | <0.0005 | 0.001 | 0.003 | <0.0005 | <0.0005 | <0.0005 | <0.0005 | <0.0005 | <0.0005 | Comp. ex. |
| 11 | 0.0005 | 3.2 | 0.08 | 0.001 | 0.001 | 0.001 | 0.003 | <0.0005 | <0.0005 | <0.0005 | <0.0005 | <0.0005 | <0.0005 | Comp. ex. |
| 12 | 0.0005 | 3.2 | 0.08 | 0.001 | 0.001 | 0.002 | 0.003 | <0.0005 | <0.0005 | <0.0005 | <0.0005 | <0.0005 | <0.0005 | Comp. ex. |
| 13 | 0.0005 | 3.2 | 0.08 | 0.001 | 0.001 | 0.001 | 0.003 | <0.0005 | <0.0005 | <0.0005 | <0.0005 | <0.0005 | <0.0005 | Comp. ex. |
| 14 | 0.0005 | 3.2 | 0.08 | 0.001 | 0.001 | 0.001 | 0.001 | <0.0005 | <0.0005 | <0.0005 | <0.0005 | <0.0005 | <0.0005 | Comp. ex. |
| 15 | 0.0005 | 3.2 | 0.08 | 0.001 | 0.001 | 0.001 | 0.003 | <0.0005 | <0.0005 | <0.0005 | <0.0005 | <0.0005 | <0.0005 | Comp. ex. |
| 16 | 0.0005 | 3.2 | 0.08 | 0.001 | 0.001 | 0.001 | 0.002 | 0.05 | <0.0005 | <0.0005 | <0.0005 | <0.0005 | <0.0005 | Inv. ex. |
| 17 | 0.0005 | 3.2 | 0.08 | 0.001 | 0.001 | 0.001 | 0.003 | 0.33 | <0.0005 | — | <0.0005 | <0.0005 | <0.0005 | Comp. ex. |
| 18 | 0.0005 | 3.2 | 0.08 | 0.001 | <0.0005 | 0.001 | 0.003 | 0.05 | 0.07 | — | <0.0005 | <0.0005 | <0.0005 | Inv. ex. |
| 19 | 0.0005 | 3.2 | 0.08 | 0.001 | <0.0005 | 0.001 | 0.003 | 0.07 | <0.0005 | 0.05 | <0.0005 | <0.0005 | <0.0005 | Inv. ex. |
| 20 | 0.0005 | 3.2 | 0.08 | 0.001 | 0.001 | 0.002 | 0.003 | 0.07 | 0.03 | 0.01 | <0.0005 | <0.0005 | <0.0005 | Inv. ex. |
| 21 | 0.0005 | 3.2 | 0.08 | 0.001 | <0.0005 | 0.001 | 0.003 | 0.08 | 0.4 | — | <0.0005 | <0.0005 | <0.0005 | Comp. ex. |
| 22 | 0.0005 | 3.2 | 0.08 | 0.001 | 0.001 | 0.001 | 0.003 | 0.07 | 0.08 | — | 0.001 | <0.0005 | <0.0005 | Inv. ex. |
| 23 | 0.0005 | 3.2 | 0.08 | 0.001 | <0.0005 | 0.001 | 0.002 | 0.07 | 0.08 | — | 0.001 | 0.001 | <0.0005 | Inv. ex. |
| 24 | 0.0005 | 3.2 | 0.08 | 0.001 | 0.001 | 0.001 | 0.003 | 0.07 | 0.08 | — | 0.002 | <0.0005 | 0.001 | Inv. ex. |
| 25 | 0.0005 | 3.2 | 0.08 | 0.001 | 0.001 | 0.001 | 0.002 | 0.07 | 0.07 | — | 0.001 | 0.001 | 0.001 | Inv. ex. | evaluated by the percentage of adhered length=(L−L$_S$)/L× 100(%) (remaining rate of the primary coating). 90% or more was deemed excellent in coating adhesion.

Primary Coating Structure

A sample of a rolling direction length 10 mm×width 10 mm was taken from each of the oriented electrical sheets of the numbered tests and electrolyzed by a constant potential in an electrolytic solution so that only the base steel sheet started to dissolve. The primary coating was peeled off and the structure and the composition of the primary coating were investigated. The method of peeling and methods of measurement used followed the above-mentioned means. The electrolytic solution used was a nonaqueous solvent-based 10% acetyl acetone-1% tetramethyl ammonium chloride methanol. The amount of electrolysis was 80 C/cm². Finally, the following values were obtained.

(1) Number density of Al concentrated regions: D3
(2) Area of regions which is anchoring oxide layer regions and is also Al concentrated regions: S5
(3) Area of Al concentrated regions: S3
(4) Distance of regions which is anchoring oxide layer regions and is also Al concentrated regions from reference value H0 of interface of surface oxide layer and anchoring oxide layer: H5
(5) Area of anchoring oxide layer regions: S1
(6) Total content of Y group elements
(7) Total content of Ca group elements
(8) Number density of Ca group concentrated regions: D4
(9) Observed area: S0

Annealing Separator

The raw material powder of the annealing separator of the aqueous slurry was measured in accordance with the above-mentioned means and the following values obtained:
(11) (0.253[Y]+0.180[La]+0.170[Ce])/0.454[Mg]: CY
(12) (0.353[Ca]+0.252[Sr]+0.195[Ba])/0.454[Mg]: CC
(13) Mean particle size of MgO: R1
(14) Mean particle size of Ca group element containing particles: R2
(15) Number density of particles containing Ca group elements≥25,000,000,000/cm³

Example 1

The aqueous slurry to be coated on the steel sheet after the decarburization annealing was prepared by mixing the MgO, Y group element-containing compounds, and Ca group element-containing compounds with water to give contents of the group elements such as shown in Table 3. At that time, the types of compounds and the contents of the group elements (CY, CC) were changed.

TABLE 3

| | | Additives in annealing separator | | | | | | | |
|---|---|---|---|---|---|---|---|---|---|
| Test no. | Steel sheet no. | CaSO$_4$ content (mass %) | SrCO$_3$ content (mass %) | BaSO$_4$ content (mass %) | CC (vol %) | Y$_2$O$_3$ content (mass %) | La$_2$O$_3$ content (mass %) | CeO$_2$ content (mass %) | CY (vol %) |
| 1 | 1 | 1.40 | 0.00 | 0.00 | 0.53 | 0.60 | 0.00 | 0.00 | 0.44 |
| 2 | 1 | 5.70 | 0.00 | 0.00 | 2.16 | 1.20 | 0.00 | 0.00 | 0.87 |
| 3 | 1 | 3.20 | 0.00 | 0.00 | 1.21 | 4.20 | 0.00 | 0.00 | 3.05 |
| 4 | 1 | 5.10 | 0.00 | 0.00 | 1.94 | 4.80 | 0.00 | 0.00 | 3.49 |
| 5 | 2 | 1.50 | 0.00 | 0.00 | 0.57 | 0.00 | 0.80 | 0.00 | 0.45 |
| 6 | 2 | 5.50 | 0.00 | 0.00 | 2.09 | 0.00 | 1.00 | 0.00 | 0.56 |
| 7 | 2 | 1.60 | 0.00 | 0.00 | 0.61 | 0.00 | 5.20 | 0.00 | 2.91 |
| 8 | 2 | 4.80 | 0.00 | 0.00 | 1.82 | 0.00 | 5.40 | 0.00 | 3.03 |
| 9 | 16 | 1.66 | 0.00 | 0.00 | 0.63 | 0.00 | 0.00 | 0.80 | 0.40 |
| 10 | 16 | 5.20 | 0.00 | 0.00 | 1.97 | 0.00 | 0.00 | 1.10 | 0.56 |
| 11 | 16 | 1.80 | 0.00 | 0.00 | 0.68 | 0.00 | 0.00 | 6.20 | 3.13 |
| 12 | 16 | 5.10 | 0.00 | 0.00 | 1.94 | 0.00 | 0.00 | 5.80 | 2.93 |
| 13 | 18 | 3.20 | 0.00 | 0.00 | 1.21 | 0.00 | 1.50 | 0.00 | 1.71 |
| 14 | 18 | 0.00 | 1.60 | 3.00 | 2.13 | 1.20 | 0.00 | 1.50 | 0.76 |
| 15 | 19 | 0.00 | 2.90 | 0.00 | 1.58 | 0.00 | 1.20 | 4.30 | 2.84 |
| 16 | 19 | 0.00 | 1.40 | 0.00 | 0.76 | 0.00 | 1.50 | 0.00 | 0.84 |
| 17 | 20 | 0.00 | 4.00 | 0.00 | 2.18 | 0.00 | 2.50 | 0.00 | 1.40 |
| 18 | 20 | 0.00 | 2.50 | 0.00 | 1.36 | 0.00 | 3.20 | 0.00 | 1.79 |
| 19 | 20 | 0.00 | 1.40 | 0.00 | 0.76 | 2.50 | 0.00 | 0.00 | 1.82 |
| 20 | 20 | 2.00 | 0.00 | 2.00 | 1.60 | 0.00 | 4.00 | 0.00 | 2.24 |
| 21 | 20 | 0.00 | 0.00 | 1.80 | 0.75 | 1.60 | 0.00 | 1.20 | 1.77 |
| 22 | 20 | 0.00 | 0.00 | 1.50 | 0.63 | 3.20 | 0.00 | 0.00 | 2.33 |
| 23 | 22 | 0.00 | 0.00 | 2.00 | 0.84 | 3.20 | 0.00 | 0.00 | 2.33 |
| 24 | 22 | 0.00 | 0.00 | 5.20 | 2.18 | 3.20 | 0.00 | 0.00 | 2.33 |
| 25 | 22 | 0.00 | 0.00 | 2.00 | 0.84 | 3.20 | 0.00 | 0.00 | 2.33 |
| 26 | 23 | 1.20 | 1.50 | 0.00 | 1.27 | 3.20 | 0.00 | 0.00 | 2.33 |
| 27 | 24 | 2.50 | 0.00 | 0.00 | 0.95 | 1.20 | 3.20 | 1.00 | 3.17 |
| 28 | 24 | 1.00 | 0.80 | 1.60 | 1.49 | 1.20 | 0.00 | 0.00 | 0.87 |
| 29 | 1 | 0.00 | 0.30 | 0.00 | 0.16 | 1.50 | 1.80 | 0.00 | 2.10 |
| 30 | 1 | 3.40 | 3.40 | 0.00 | 3.15 | 0.00 | 0.00 | 1.50 | 0.76 |
| 31 | 1 | 3.00 | 0.00 | 0.00 | 1.14 | 0.20 | 0.00 | 0.00 | 0.15 |
| 32 | 2 | 0.00 | 3.00 | 0.00 | 1.64 | 0.00 | 7.50 | 0.00 | 4.20 |
| 33 | 2 | 0.00 | 1.00 | 0.00 | 0.55 | 2.50 | 0.00 | 0.00 | 1.82 |
| 34 | 2 | 5.50 | 0.00 | 0.00 | 2.09 | 0.00 | 2.50 | 0.00 | 1.40 |
| 35 | 16 | 3.00 | 0.00 | 0.00 | 1.14 | 0.00 | 0.00 | 2.00 | 1.01 |
| 36 | 16 | 0.00 | 2.50 | 0.00 | 1.36 | 2.80 | 0.00 | 0.00 | 2.04 |
| 37 | 18 | 0.00 | 0.00 | 2.50 | 1.05 | 0.00 | 2.60 | 0.00 | 1.46 |
| 38 | 18 | 2.00 | 0.00 | 0.00 | 0.76 | 2.80 | 0.00 | 0.00 | 2.04 |
| 39 | 20 | 0.00 | 0.00 | 0.00 | 0.00 | 0.00 | 0.00 | 0.00 | 0.00 |
| 40 | 20 | 0.00 | 0.00 | 0.00 | 0.00 | 0.00 | 3.20 | 0.00 | 1.79 |
| 41 | 22 | 2.10 | 0.00 | 1.80 | 1.55 | 0.00 | 0.00 | 0.00 | 0.00 |
| 42 | 22 | 0.30 | 0.00 | 0.00 | 0.11 | 0.40 | 0.00 | 0.00 | 0.29 |

TABLE 3-continued

| | | | | | | | | | |
|---|---|---|---|---|---|---|---|---|---|
| 43 | 25 | 3.00 | 0.00 | 0.80 | 1.47 | 0.50 | 0.00 | 1.50 | 1.12 |
| 44 | 25 | 2.00 | 0.00 | 2.00 | 1.60 | 0.00 | 4.00 | 0.00 | 2.24 |

| | Additives in annealing separator | | | | | | | |
|---|---|---|---|---|---|---|---|---|
| Test no. | RCa (μm) | Rsr (μm) | RBa (μm) | R1 (μm) | R2 (μm) | R2/R1 | No. of Ca-containing particles 100,000,000/cm³ | Remarks |
| 1 | 0.30 | — | — | 0.60 | 0.30 | 0.50 | 281 | Inv. ex. |
| 2 | 0.30 | — | — | 0.60 | 0.30 | 0.50 | 281 | Inv. ex. |
| 3 | 0.30 | — | — | 0.60 | 0.30 | 0.50 | 281 | Inv. ex. |
| 4 | 0.30 | — | — | 0.60 | 0.30 | 0.50 | 281 | Inv. ex. |
| 5 | 0.30 | — | — | 0.60 | 0.30 | 0.50 | 281 | Inv. ex. |
| 6 | 0.30 | — | — | 0.60 | 0.30 | 0.50 | 281 | Inv. ex. |
| 7 | 0.20 | — | — | 0.65 | 0.20 | 0.31 | 360 | Inv. ex. |
| 8 | 0.20 | — | — | 0.65 | 0.20 | 0.31 | 360 | Inv. ex. |
| 9 | 0.20 | — | — | 0.65 | 0.20 | 0.31 | 360 | Inv. ex. |
| 10 | 0.20 | — | — | 0.65 | 0.20 | 0.31 | 360 | Inv. ex. |
| 11 | 0.20 | — | — | 0.65 | 0.20 | 0.31 | 360 | Inv. ex. |
| 12 | 0.20 | — | — | 0.65 | 0.20 | 0.31 | 360 | Inv. ex. |
| 13 | 0.20 | — | — | 0.65 | 0.20 | 0.31 | 360 | Inv. ex. |
| 14 | — | 0.90 | 0.90 | 0.50 | 0.90 | 1.80 | 322 | Inv. ex. |
| 15 | — | 0.90 | — | 0.50 | 0.90 | 1.80 | 297 | Inv. ex. |
| 16 | — | 0.90 | — | 0.50 | 0.90 | 1.80 | 297 | Inv. ex. |
| 17 | — | 0.90 | — | 0.50 | 0.90 | 1.80 | 297 | Inv. ex. |
| 18 | — | 0.90 | — | 0.50 | 0.90 | 1.80 | 297 | Inv. ex. |
| 19 | — | 0.90 | — | 0.50 | 0.90 | 1.80 | 297 | Inv. ex. |
| 20 | 1.40 | — | 1.40 | 0.55 | 1.40 | 2.55 | 257 | Inv. ex. |
| 21 | — | — | 1.40 | 0.55 | 1.40 | 2.55 | 288 | Inv. ex. |
| 22 | — | — | 1.40 | 0.55 | 1.40 | 2.55 | 288 | Inv. ex. |
| 23 | — | — | 1.40 | 0.55 | 1.40 | 2.55 | 288 | Inv. ex. |
| 24 | — | — | 1.40 | 0.55 | 1.40 | 2.55 | 288 | Inv. ex. |
| 25 | — | — | 1.40 | 0.55 | 1.40 | 2.55 | 288 | Inv. ex. |
| 26 | 1.40 | 1.40 | — | 0.55 | 1.40 | 2.55 | 255 | Inv. ex. |
| 27 | 1.40 | — | — | 0.55 | 1.40 | 2.55 | 269 | Inv. ex. |
| 28 | 1.40 | 1.40 | 1.40 | 0.55 | 1.40 | 2.55 | 273 | Inv. ex. |
| 29 | — | 0.40 | — | 1.20 | 0.40 | 0.33 | 284 | Comp. ex. |
| 30 | 1.20 | — | — | 1.20 | 1.20 | 1.00 | 267 | Comp. ex. |
| 31 | 1.20 | — | — | 1.20 | 1.20 | 1.00 | 291 | Comp. ex. |
| 32 | — | 1.20 | — | 1.20 | 1.20 | 1.00 | 249 | Comp. ex. |
| 33 | — | 0.06 | — | 0.60 | 0.06 | 0.30 | 283 | Comp. ex. |
| 34 | 1.80 | — | — | 1.20 | 1.80 | 1.50 | 295 | Comp. ex. |
| 35 | 0.15 | — | — | 0.06 | 0.15 | 2.50 | 1252 | Comp. ex. |
| 36 | — | 1.50 | — | 2.20 | 1.50 | 0.68 | 259 | Comp. ex. |
| 37 | — | — | 0.40 | 1.50 | 0.40 | 0.27 | 323 | Comp. ex. |
| 38 | 1.40 | — | — | 0.40 | 1.40 | 3.50 | 251 | Comp. ex. |
| 39 | — | — | — | 1.50 | — | — | 317 | Comp. ex. |
| 40 | — | — | — | 1.50 | — | — | 317 | Comp. ex. |
| 41 | 1.40 | — | 1.40 | 1.50 | 1.40 | 0.93 | 341 | Comp. ex. |
| 42 | 1.20 | — | — | 1.50 | 1.20 | 0.80 | 325 | Comp. ex. |
| 43 | 1.40 | — | — | 1.50 | 1.40 | 0.93 | 251 | Comp. ex. |
| 44 | 2.24 | — | 1.52 | 1.52 | 1.52 | 1.00 | 238 | Comp. ex. |

Table 4 shows the results. If the remaining rate of the primary coating is 90% or more, it is judged that the adhesion of the primary coating to the base steel sheet is excellent. Further, if the magnetic flux density B8 is 1.92 or more and the iron loss W17/50 after laser emission is 0.85 or less, it was judged that the magnetic properties were excellent. It is learned that satisfying the provisions of the present invention gives excellent properties. Referring to Table 3, in Test Nos. 1 to 28, the chemical composition was suitable and the conditions in the annealing separator (CC, CY, R1, R2, R2/R1) were suitable. As a result, the area ratio S1/S0 of the anchoring oxide layer (2) became 0.15 or more, the ratio S5/S3 of the anchoring Al regions A5 became 0.33 or more, the distance H5 was 0.4 or more, the number density D3 of the Al concentrated regions became 0.020 or more, and the results were within the scope of the present invention. As a result, in each of the grain-oriented electrical steel sheets of these numbered tests, the magnetic flux density B8 was 1.92T or more and excellent magnetic properties were obtained. Furthermore, the remaining rate of the primary coating was 90% or more and excellent adhesion was exhibited. Furthermore, the appearance of the primary coating was also excellent.

On the other hand, in Test Nos. 29 and 40, the total volume ratio CC of the Ca group elements was too small, the primary coating did not develop in form, S1/S0 became less than 1.5, S5/S3 became less than 0.33, and D3 became 0.020. As a result, the remaining rates of the primary coating were respectively 84% and 56% and the coating adhesion became poor.

In Test No. 30, the total volume ratio CC of the Ca group elements was too great, the primary coating developed too much in form, and D3 became over $0.180/\mu m^2$. As a result, the iron loss W17/50 was 0.852 W/kg and the magnetic properties became poor.

In Test Nos. 31 and 41, the total volume ratio CY of the Y group elements was too small, the thickness of the primary coating became thin, and H5 became less than 0.40 μm. As a result, the remaining rates of the primary coating were respectively 62% and 58% and the coating adhesion became poor.

In Test No. 32, the total volume ratio CY of the Y group elements was too great, the thickness of the primary coating became too great, and H5 became over 4.0 μm. As a result, the magnetic flux density B8 was 1.913T and the magnetic properties became poor.

In Test No. 33, R2 was too small, the supply of Ca group elements and Mg became lopsided, and S1/S0 became less than 0.15. As a result, the remaining rate of the primary coating was 72% and the coating adhesion became poor.

In Test No. 34, R2 was too large, the supply of Ca group elements and Mg became lopsided, and, as a result of the Ca group elements, S1/S0 became less than 0.15. As a result, the remaining rate of the primary coating was 84% and the coating adhesion was poor.

In Test No. 35, R1 was too small and the sheets stuck together.

In Test No. 36, R1 was too large and the supply of Mg to the coating was slow. As a result, S1/S0, S5/S3, H5, and D3 all fell below the reference values. As a result, the remaining rate of the primary coating was 52% and the coating adhesion was poor.

In Test No. 37, R2/R1 was too small and the supply of Mg with respect to Ca was slow. As a result, S5/S3 fell below the reference value. As a result, the remaining rate of the primary coating was 88% and the coating adhesion was poor.

In Test No. 38, R2/R1 was too large and the supply of Ca with respect to Mg was slow. As a result, D3 fell below the reference value. As a result, the remaining rate of the primary coating was 89% and the coating adhesion was poor.

In Test Nos. 39 and 42, CC and CY were both too small. As a result, the primary coating was not sufficiently developed in form. As a result, S1/S0 became less than 0.15, S5/S3 became less than 0.33, H5 became less than 0.40, D3 became less than 0.020, the remaining rates of the primary coating respectively were 31% and 14%, and the coating adhesion was poor.

In Test No. 43, the steel constituents Bi, Te, and Pb were too great. As a result, the primary coating became remarkably degraded and the effect of development of the coating in form by the additives to the annealing separator became insufficient. As a result, S1/S0 became less than 0.15, H5 became less than 0.40, D3 became less than 0.020, the remaining rate of the primary coating was 10%, and the coating adhesion was poor.

In Test No. 44, the number density of the Ca group element containing particles in the raw material powder was small. As a result, S5 became less than 0.33, the remaining rate of the primary coating was 78%, and the coating adhesion was poor.

TABLE 4

| | | Additives in annealing separator | | | | | Form of primary coating | |
|---|---|---|---|---|---|---|---|---|
| | Steel | CC | CY | R1 | R2 | | No. of Ca-containing particles | | |
| Test no. | sheet no. | (vol. %) | (vol. %) | (μm) | (μm) | R2/R1 | 100,000,000/cm³ | S1/S0 | S5/S3 |
| 1 | 1 | 0.53 | 0.44 | 0.60 | 0.30 | 0.50 | 281 | 0.18 | 0.42 |
| 2 | 1 | 2.16 | 0.87 | 0.60 | 0.30 | 0.50 | 281 | 0.19 | 0.41 |
| 3 | 1 | 1.21 | 3.05 | 0.60 | 0.30 | 0.50 | 281 | 0.18 | 0.42 |
| 4 | 1 | 1.94 | 3.49 | 0.60 | 0.30 | 0.50 | 281 | 0.17 | 0.42 |
| 5 | 2 | 0.57 | 0.45 | 0.60 | 0.30 | 0.50 | 281 | 0.16 | 0.40 |
| 6 | 2 | 2.09 | 0.56 | 0.60 | 0.30 | 0.50 | 281 | 0.17 | 0.41 |
| 7 | 2 | 0.61 | 2.91 | 0.65 | 0.20 | 0.31 | 360 | 0.18 | 0.42 |
| 8 | 2 | 1.82 | 3.03 | 0.65 | 0.20 | 0.31 | 360 | 0.18 | 0.38 |
| 9 | 16 | 0.63 | 0.40 | 0.65 | 0.20 | 0.31 | 360 | 0.17 | 0.44 |
| 10 | 16 | 1.97 | 0.56 | 0.65 | 0.20 | 0.31 | 360 | 0.16 | 0.41 |
| 11 | 16 | 0.68 | 3.13 | 0.65 | 0.20 | 0.31 | 360 | 0.17 | 0.42 |
| 12 | 16 | 1.94 | 2.93 | 0.65 | 0.20 | 0.31 | 360 | 0.17 | 0.39 |
| 13 | 18 | 1.21 | 1.71 | 0.65 | 0.20 | 0.31 | 360 | 0.18 | 0.41 |
| 14 | 18 | 2.13 | 0.76 | 0.50 | 0.90 | 1.80 | 322 | 0.18 | 0.39 |
| 15 | 19 | 1.58 | 2.84 | 0.50 | 0.90 | 1.80 | 297 | 0.19 | 0.44 |
| 16 | 19 | 0.76 | 0.84 | 0.50 | 0.90 | 1.80 | 297 | 0.18 | 0.39 |
| 17 | 20 | 2.18 | 1.40 | 0.50 | 0.90 | 1.80 | 297 | 0.17 | 0.42 |
| 18 | 20 | 1.36 | 1.79 | 0.50 | 0.90 | 1.80 | 297 | 0.18 | 0.45 |
| 19 | 20 | 0.76 | 1.82 | 0.50 | 0.90 | 1.80 | 297 | 0.17 | 0.38 |
| 20 | 20 | 1.60 | 2.24 | 0.55 | 1.40 | 2.55 | 257 | 0.17 | 0.35 |
| 21 | 20 | 0.75 | 1.77 | 0.55 | 1.40 | 2.55 | 288 | 0.17 | 0.38 |
| 22 | 20 | 0.63 | 2.33 | 0.55 | 1.40 | 2.55 | 288 | 0.17 | 0.34 |
| 23 | 22 | 0.84 | 2.33 | 0.55 | 1.40 | 2.55 | 288 | 0.18 | 0.33 |
| 24 | 22 | 2.18 | 2.33 | 0.55 | 1.40 | 2.55 | 288 | 0.17 | 0.42 |
| 25 | 22 | 0.84 | 2.33 | 0.55 | 1.40 | 2.55 | 288 | 0.19 | 0.39 |
| 26 | 23 | 1.27 | 2.33 | 0.55 | 1.40 | 2.55 | 255 | 0.19 | 0.35 |
| 27 | 24 | 0.95 | 3.17 | 0.55 | 1.40 | 2.55 | 269 | 0.17 | 0.35 |
| 28 | 24 | 1.49 | 0.87 | 0.55 | 1.40 | 2.55 | 273 | 0.17 | 0.34 |
| 29 | 1 | 0.16 | 2.10 | 1.20 | 0.40 | 0.33 | 284 | 0.14 | 0.28 |
| 30 | 1 | 3.15 | 0.76 | 1.20 | 1.20 | 1.00 | 267 | 0.19 | 0.45 |
| 31 | 1 | 1.14 | 0.15 | 1.20 | 1.20 | 1.00 | 291 | 0.15 | 0.35 |
| 32 | 2 | 1.64 | 4.20 | 1.20 | 1.20 | 1.00 | 249 | 0.17 | 0.34 |
| 33 | 2 | 0.55 | 1.82 | 0.60 | 0.06 | 0.30 | 283 | 0.14 | 0.66 |
| 34 | 2 | 2.09 | 1.40 | 1.20 | 1.80 | 1.50 | 295 | 0.12 | 0.35 |
| 35 | 16 | 1.14 | 1.01 | 0.06 | 0.15 | 2.50 | 1252 | — | — |
| 36 | 16 | 1.36 | 2.04 | 2.20 | 1.50 | 0.68 | 259 | 0.12 | 0.27 |
| 37 | 18 | 1.05 | 1.46 | 1.50 | 0.40 | 0.27 | 323 | 0.2 | 0.28 |
| 38 | 18 | 0.76 | 2.04 | 0.40 | 1.40 | 3.50 | 251 | 0.21 | 0.34 |
| 39 | 20 | 0.00 | 0.00 | 1.50 | — | — | 317 | 0.12 | 0.31 |

TABLE 4-continued

| Test no. | | | | | | | | | |
|---|---|---|---|---|---|---|---|---|---|
| 40 | 20 | 0.00 | 1.79 | 1.50 | — | — | 317 | 0.14 | 0.32 |
| 41 | 22 | 1.55 | 0.00 | 1.50 | 1.40 | 0.93 | 341 | 0.19 | 0.34 |
| 42 | 22 | 0.11 | 0.29 | 1.50 | 1.20 | 0.80 | 325 | 0.12 | 0.14 |
| 43 | 25 | 1.47 | 1.12 | 1.5 | 1.4 | 0.93 | 251 | 0.12 | 0.4 |
| 44 | 25 | 1.60 | 2.24 | 1.52 | 1.52 | 1.00 | 238 | 0.42 | 0.39 |

| | Form of primary coating | | Constituents in primary coating | | Evaluation | | | |
|---|---|---|---|---|---|---|---|---|
| | | | Content of Ca group elements in | | Remaining rate of primary | Magnetic flux | Iron loss | |
| Test no. | H5 | D3 | coating | D4 | coating | density B8 | W17/50 | Remarks |
| 1 | 0.41 | 0.024 | 0.28 | 0.032 | 92 | 1.922 | 0.737 | Inv. ex. |
| 2 | 0.45 | 0.064 | 3.22 | 0.122 | 94 | 1.921 | 0.757 | Inv. ex. |
| 3 | 1.04 | 0.024 | 0.53 | 0.076 | 92 | 1.929 | 0.720 | Inv. ex. |
| 4 | 2.88 | 0.045 | 4.39 | 0.077 | 98 | 1.921 | 0.727 | Inv. ex. |
| 5 | 0.96 | 0.022 | 0.32 | 0.029 | 91 | 1.922 | 0.742 | Inv. ex. |
| 6 | 0.88 | 0.055 | 2.88 | 0.128 | 91 | 1.920 | 0.743 | Inv. ex. |
| 7 | 2.80 | 0.024 | 0.25 | 0.041 | 91 | 1.924 | 0.737 | Inv. ex. |
| 8 | 2.56 | 0.032 | 3.54 | 0.098 | 95 | 1.922 | 0.733 | Inv. ex. |
| 9 | 0.72 | 0.026 | 0.41 | 0.060 | 91 | 1.932 | 0.721 | Inv. ex. |
| 10 | 0.96 | 0.058 | 1.55 | 0.139 | 91 | 1.925 | 0.739 | Inv. ex. |
| 11 | 3.52 | 0.022 | 0.54 | 0.021 | 92 | 1.933 | 0.716 | Inv. ex. |
| 12 | 1.00 | 0.037 | 4.22 | 0.157 | 98 | 1.922 | 0.721 | Inv. ex. |
| 13 | 0.67 | 0.035 | 1.34 | 0.075 | 95 | 1.932 | 0.703 | Inv. ex. |
| 14 | 0.42 | 0.028 | 1.68 | 0.015 | 94 | 1.929 | 0.724 | Inv. ex. |
| 15 | 0.98 | 0.03 | 1.42 | 0.023 | 94 | 1.924 | 0.722 | Inv. ex. |
| 16 | 1.15 | 0.026 | 0.92 | 0.013 | 91 | 1.942 | 0.689 | Inv. ex. |
| 17 | 1.72 | 0.112 | 4.41 | 0.027 | 95 | 1.926 | 0.789 | Inv. ex. |
| 18 | 1.86 | 0.024 | 1.23 | 0.018 | 92 | 1.952 | 0.674 | Inv. ex. |
| 19 | 1.90 | 0.029 | 1.82 | 0.021 | 93 | 1.930 | 0.714 | Inv. ex. |
| 20 | 1.85 | 0.03 | 1.92 | 0.024 | 94 | 1.920 | 0.741 | Inv. ex. |
| 21 | 1.90 | 0.051 | 1.75 | 0.013 | 92 | 1.925 | 0.734 | Inv. ex. |
| 22 | 1.87 | 0.028 | 1.52 | 0.015 | 99 | 1.931 | 0.715 | Inv. ex. |
| 23 | 1.85 | 0.024 | 0.95 | 0.012 | 92 | 1.933 | 0.719 | Inv. ex. |
| 24 | 1.99 | 0.14 | 3.55 | 0.013 | 99 | 1.931 | 0.784 | Inv. ex. |
| 25 | 1.96 | 0.025 | 1.74 | 0.012 | 94 | 1.931 | 0.714 | Inv. ex. |
| 26 | 2.01 | 0.044 | 2.01 | 0.014 | 97 | 1.928 | 0.711 | Inv. ex. |
| 27 | 1.99 | 0.038 | 1.64 | 0.016 | 92 | 1.925 | 0.709 | Inv. ex. |
| 28 | 1.12 | 0.029 | 1.22 | 0.021 | 92 | 1.925 | 0.729 | Inv. ex. |
| 29 | 0.78 | 0.014 | 0.08 | 0.003 | 84 | 1.925 | 0.750 | Comp. ex. |
| 30 | 0.42 | 0.192 | 8.12 | 0.016 | 92 | 1.923 | 0.852 | Comp. ex. |
| 31 | 0.25 | 0.055 | 0.58 | 0.009 | 62 | 1.940 | 0.693 | Comp. ex. |
| 32 | 4.08 | 0.052 | 0.64 | 0.014 | 91 | 1.913 | 0.759 | Comp. ex. |
| 33 | 0.70 | 0.021 | 1.28 | 0.051 | 72 | 1.922 | 0.747 | Comp. ex. |
| 34 | 0.59 | 0.015 | 1.34 | 0.013 | 84 | 1.932 | 0.732 | Comp. ex. |
| 35 | — | — | — | — | — | — | — | — |
| 36 | 0.39 | 0.016 | 1.54 | 0.015 | 52 | 1.932 | 0.727 | Comp. ex. |
| 37 | 0.61 | 0.031 | 0.26 | 0.036 | 88 | 1.925 | 0.728 | Comp. ex. |
| 38 | 0.76 | 0.018 | 4.22 | 0.043 | 89 | 1.924 | 0.744 | Comp. ex. |
| 39 | 0.21 | 0.012 | 0.06 | 0.002 | 31 | 1.924 | 0.742 | Comp. ex. |
| 40 | 0.70 | 0.015 | 0.08 | 0.002 | 56 | 1.921 | 0.755 | Comp. ex. |
| 41 | 0.21 | 0.021 | 2.40 | 0.011 | 58 | 1.924 | 0.738 | Comp. ex. |
| 42 | 0.38 | 0.011 | 1.56 | 0.006 | 14 | 1.932 | 0.738 | Comp. ex. |
| 43 | 0.32 | 0.011 | 1.21 | 0.005 | 10 | 1.955 | 0.671 | Comp. ex. |
| 44 | 0.51 | 0.014 | 1.08 | 0.008 | 87 | 1.954 | 0.688 | Comp. ex. |

Example 2

The aqueous slurry to be coated on the steel sheet after the decarburization annealing was prepared by mixing with water so as to give the MgO, Y group element containing compounds, Ca group element containing compounds, and Ti group containing compounds in the group element contents as in Table 5. At this time, the types of compounds and the contents of the group elements (CY, CC, and CT) were changed.

TABLE 5

| | | Additives in annealing separator | | | | | | | |
|---|---|---|---|---|---|---|---|---|---|
| Test no. | Steel sheet no. | $CaSO_4$ content (mass %) | $SrCO_3$ content (mass %) | $BaSO_4$ content (mass %) | CC (vol. %) | $Y_2O_3$ content (mass %) | $La_2O_3$ content (mass %) | $CeO_2$ content (mass %) | CY (vol. %) |
| 45 | 20 | 1.40 | 0.00 | 0.00 | 0.72 | 0.00 | 1.40 | 0.00 | 0.78 |
| 46 | 20 | 0.00 | 0.00 | 4.20 | 1.76 | 0.00 | 0.00 | 1.50 | 0.76 |
| 47 | 20 | 0.00 | 1.50 | 0.00 | 0.66 | 3.50 | 0.00 | 0.00 | 2.55 |

TABLE 5-continued

| | | | | | | | | |
|---|---|---|---|---|---|---|---|---|
| 48 | 20 | 0.00 | 4.50 | 0.00 | 1.98 | 0.00 | 4.50 | 0.00 | 2.52 |
| 49 | 20 | 0.00 | 0.00 | 1.30 | 0.54 | 1.20 | 0.00 | 0.00 | 0.87 |
| 50 | 22 | 4.20 | 0.00 | 0.00 | 2.17 | 0.00 | 1.40 | 0.00 | 0.78 |
| 51 | 22 | 0.00 | 1.20 | 0.00 | 0.53 | 0.00 | 0.00 | 5.30 | 2.68 |
| 52 | 22 | 0.00 | 4.20 | 0.00 | 1.84 | 0.00 | 4.90 | 0.00 | 2.75 |
| 53 | 22 | 0.40 | 1.80 | 0.00 | 1.00 | 0.00 | 0.00 | 3.20 | 1.62 |
| 54 | 23 | 0.00 | 0.00 | 3.30 | 1.38 | 0.00 | 4.20 | 1.80 | 3.26 |
| 55 | 23 | 0.20 | 0.50 | 0.70 | 0.62 | 0.00 | 1.20 | 0.00 | 0.67 |
| 56 | 23 | 0.00 | 4.20 | 0.00 | 1.84 | 0.20 | 0.50 | 0.10 | 0.48 |
| 57 | 23 | 1.20 | 1.40 | 1.50 | 1.86 | 0.00 | 1.50 | 0.50 | 1.09 |
| 58 | 24 | 0.50 | 0.00 | 0.60 | 0.51 | 2.50 | 0.60 | 1.50 | 2.91 |
| 59 | 24 | 0.20 | 0.60 | 0.90 | 0.74 | 1.20 | 0.20 | 0.00 | 0.99 |
| 60 | 24 | 3.20 | 0.00 | 1.20 | 2.16 | 0.80 | 1.20 | 0.20 | 1.36 |
| 61 | 24 | 0.80 | 0.70 | 0.40 | 0.89 | 1.80 | 1.20 | 0.00 | 1.98 |
| 62 | 20 | 0.00 | 0.00 | 0.00 | 0.00 | 0.00 | 0.00 | 0.00 | 0.00 |
| 63 | 20 | 3.20 | 0.00 | 0.00 | 1.65 | 3.00 | 0.00 | 0.00 | 2.18 |
| 64 | 20 | 0.00 | 2.90 | 0.00 | 1.27 | 0.00 | 0.00 | 4.20 | 2.12 |
| 65 | 20 | 1.80 | 2.50 | 2.00 | 2.86 | 1.00 | 2.00 | 0.00 | 1.85 |
| 66 | 22 | 0.00 | 0.00 | 4.50 | 1.88 | 3.50 | 0.00 | 2.50 | 3.81 |
| 67 | 22 | 0.50 | 0.20 | 0.00 | 0.35 | 0.00 | 0.00 | 3.50 | 1.77 |
| 68 | 22 | 2.50 | 0.90 | 0.00 | 1.69 | 0.20 | 0.40 | 0.00 | 0.37 |
| 69 | 22 | 0.00 | 0.30 | 0.60 | 0.38 | 1.50 | 2.00 | 0.00 | 2.21 |
| 70 | 23 | 3.50 | 0.00 | 0.00 | 1.81 | 0.20 | 0.00 | 0.40 | 0.35 |
| 71 | 23 | 1.50 | 0.00 | 1.50 | 1.40 | 2.60 | 0.00 | 3.20 | 3.51 |
| 72 | 23 | 3.00 | 2.00 | 0.00 | 2.43 | 1.20 | 1.20 | 1.20 | 2.15 |
| 73 | 24 | 1.50 | 0.00 | 1.50 | 1.40 | 2.60 | 0.00 | 3.20 | 3.51 |
| 74 | 24 | 3.00 | 2.00 | 0.00 | 2.43 | 1.20 | 1.20 | 1.20 | 2.15 |
| 75 | 24 | 1.50 | 0.00 | 1.50 | 1.40 | 2.60 | 0.00 | 3.20 | 3.51 |
| 76 | 24 | 3.00 | 2.00 | 0.00 | 2.43 | 1.20 | 1.20 | 1.20 | 2.15 |
| 77 | 25 | 0.40 | 1.80 | 0.00 | 1.00 | 0.00 | 0.00 | 3.20 | 1.62 |
| 78 | 23 | 1.20 | 1.40 | 1.50 | 1.86 | 0.00 | 1.50 | 0.50 | 1.09 |

| | Additives in annealing separator | | | | | | | |
|---|---|---|---|---|---|---|---|---|
| Test no. | $TiO_2$ content (mass %) | $ZrO_2$ content (mass %) | $HfO_2$ content (mass %) | CT (vol. %) | R1 (μm) | R2 (μm) | R2/R1 | No. of Ca-containing particles 100,000,000/cm$^3$ |
| 45 | 2.50 | 0.00 | 0.00 | 2.03 | 0.60 | 0.80 | 1.33 | 267 |
| 46 | 0.00 | 2.50 | 0.00 | 1.61 | 1.50 | 0.80 | 0.53 | 284 |
| 47 | 0.00 | 0.00 | 2.50 | 0.94 | 1.50 | 0.80 | 0.53 | 341 |
| 48 | 2.50 | 0.00 | 1.20 | 2.48 | 1.50 | 0.80 | 0.53 | 295 |
| 49 | 0.00 | 0.00 | 5.00 | 1.89 | 1.50 | 0.80 | 0.53 | 316 |
| 50 | 0.00 | 7.00 | 0.00 | 4.50 | 1.50 | 1.40 | 0.93 | 348 |
| 51 | 5.00 | 0.00 | 0.00 | 4.05 | 1.50 | 1.28 | 0.85 | 255 |
| 52 | 2.00 | 5.00 | 0.00 | 4.83 | 1.50 | 1.28 | 0.85 | 267 |
| 53 | 0.00 | 1.40 | 1.20 | 1.35 | 1.50 | 1.28 | 0.85 | 314 |
| 54 | 6.00 | 0.00 | 0.00 | 4.86 | 1.50 | 1.23 | 0.82 | 329 |
| 55 | 0.00 | 0.00 | 4.00 | 1.51 | 1.50 | 1.29 | 0.86 | 381 |
| 56 | 1.80 | 1.40 | 0.00 | 2.36 | 1.50 | 1.28 | 0.85 | 264 |
| 57 | 0.00 | 2.00 | 0.00 | 1.29 | 1.50 | 1.29 | 0.86 | 311 |
| 58 | 0.00 | 0.00 | 1.50 | 0.57 | 1.50 | 1.13 | 0.75 | 296 |
| 59 | 5.00 | 3.00 | 0.00 | 5.98 | 1.50 | 0.67 | 0.45 | 268 |
| 60 | 0.00 | 4.00 | 2.00 | 3.32 | 1.50 | 1.40 | 0.93 | 277 |
| 61 | 3.20 | 0.00 | 0.00 | 2.59 | 1.50 | 1.40 | 0.93 | 216 |
| 62 | 0.00 | 8.00 | 0.00 | 5.14 | 1.20 | — | — | 299 |
| 63 | 2.50 | 0.00 | 1.50 | 2.59 | 1.50 | 0.20 | 0.13 | 291 |
| 64 | 5.30 | 0.00 | 0.00 | 4.29 | 0.40 | 1.50 | 3.75 | 362 |
| 65 | 0.00 | 1.50 | 3.20 | 2.17 | 1.50 | 1.40 | 0.93 | 554 |
| 66 | 0.00 | 0.00 | 4.50 | 1.70 | 1.50 | 1.40 | 0.93 | 281 |
| 67 | 2.80 | 3.20 | 0.00 | 4.32 | 1.50 | 1.40 | 0.93 | 341 |
| 68 | 0.00 | 1.50 | 1.80 | 4.64 | 1.50 | 1.40 | 0.93 | 336 |
| 69 | 4.60 | 1.20 | 3.00 | 5.63 | 1.50 | 1.40 | 0.93 | 289 |
| 70 | 0.00 | 0.00 | 6.00 | 2.26 | 1.50 | 1.40 | 0.93 | 269 |
| 71 | 11.00 | 0.00 | 0.00 | 8.91 | 1.50 | 1.40 | 0.93 | 300 |
| 72 | 5.50 | 0.00 | 5.50 | 6.53 | 1.50 | 1.40 | 0.93 | 437 |
| 73 | 6.00 | 0.00 | 0.00 | 4.86 | 0.20 | 0.07 | 0.36 | 361 |
| 74 | 0.00 | 2.00 | 5.50 | 3.36 | 1.50 | 1.68 | 1.12 | 328 |
| 75 | 4.20 | 0.00 | 3.00 | 4.53 | 0.06 | 0.17 | 2.79 | 377 |
| 76 | 5.50 | 0.00 | 0.00 | 4.46 | 1.80 | 1.20 | 0.67 | 312 |
| 77 | 0.00 | 1.40 | 1.20 | 1.35 | 1.50 | 1.28 | 0.85 | 344 |
| 78 | 0.00 | 2.00 | 0.00 | 1.29 | 1.50 | 1.32 | 0.88 | 242 |

Table 6 shows the results. If the remaining rate of the primary coating is 90% or more, it is judged that the adhesion of the primary coating to the base steel sheet is excellent. It is learned that satisfying the provisions of the present invention gives excellent properties. Further, if the magnetic flux density B8 is 1.92 or more and the iron loss W17/50 after laser emission is 0.85 or less, the magnetic properties are excellent. It is learned that satisfying the provisions of the present invention gives excellent properties. Referring to Table 5, in Test Nos. 45 to 61, the chemical composition was suitable and the conditions in the annealing separator (CC, CY, R1, R2, R2/R1) were suitable. As a result, the area ratio S1/S0 of the anchoring oxide layer (2) became 0.15 or more, the region S5/S3 of the anchoring Al region A5 became 0.33 or more, the distance H5 was 0.4 or more, the number density D3 of the Al concentrated regions became 0.020 or more, and the results were within the scope of the present invention. As a result, in each of the grain-oriented electrical steel sheets of these numbered tests, the magnetic flux density B8 was 1.92T or more and excellent magnetic properties were obtained. Furthermore, the remaining rate of the primary coating was 90% or more and excellent adhesion was exhibited.

On the other hand, in Test Nos. 62, CC and CY were both too small. As a result, the primary coatings could not be sufficiently developed in form. As a result, S1/S0 became less than 0.15, S5/S3 became less than 0.33, H5 became less than 0.40, D3 became less than 0.020, the remaining rate of the primary coating was 42%, and the coating adhesion was poor.

In Test No. 63, R2/R1 was too small and the supply of Mg with respect to Ca was slow. As a result, S5/S3 fell below the reference value. As a result, the remaining rate of the primary coating was 72% and the coating adhesion was poor.

In Test No. 64, R2/R1 was too large and the supply of Ca with respect to Mg was slow. As a result, D3 fell below the reference value. As a result, the remaining rate of the primary coating was 71% and the coating adhesion was poor.

In Test No. 65, the total content CC of the Ca group elements was too great, the primary coating became too developed in form, and D3 became over $0.180/\mu m^2$. As a result, the iron loss 17/50 was 0.853 W/kg and the magnetic properties became poor.

In Test No. 66, the total content CY of the Y group elements was too great, the thickness of the primary coating became too thick, and H5 became over 4.0 μm. As a result, the magnetic flux density B8 was 1.911T and the magnetic properties became poor.

In Test Nos. 67 and 69, the total content CC of the Ca group elements was too small, the primary coating was not developed in form, S1/S0 became less than 1.5, S5/S3 became less than 0.33, and D3 became less than 0.020. As a result, the remaining rates of the primary coating respectively became 82% and 78% and the coating adhesion became poor.

In Test Nos. 68 and 70, the total content CY of the Y group elements was too small, the thickness of the primary coating became thin, and H5 became less than 0.40 μm. As a result, the remaining rates of the primary coating respectively became 69% and 71% and the coating adhesion became poor.

In Test Nos. 71 and 72, the total volume ratio CT of the Ti group elements was too great, and D3 became over $0.180/\mu m^2$. As a result, the iron losses W17/50 were respectively 0.861 and 0.855 W/kg and the magnetic properties became poor.

In Test No. 73, R2 was too small, the supply of Ca group elements and Mg became lopsided, and S1/S0 became less than 0.15. As a result, the remaining rate of the primary coating was 69% and the coating adhesion was poor.

In Test No. 74, R2 was too large, the supply of Ca group elements and Mg became lopsided and as a result of the Ca group elements, S1/S0 became less than 0.15. As a result, the remaining rate of the primary coating was 78% and the coating adhesion was poor.

In Test No. 75, R1 was too small and sticking of the sheets occurred.

In Test No. 76, R1 was too large and the supply of Mg to the coating was slow. As a result, S1/S0, S5/S3, H5, and D3 all became lower than the reference values. As a result, the remaining rate of the primary coating was 84% and the coating adhesion was poor.

In Test No. 77, the optional elements in the steel and the Bi, Te, and Pb of the steel constituents were too great. As a result, the primary coating remarkably deteriorated and the effect of development of the coating in form due to the additives to the annealing separator was insufficient. As a result, S1/S0 became less than 0.15, H5 became less than 0.40, D3 became less than 0.020, the remaining rate of the primary coating was 10%, and the coating adhesion was poor.

In Test No. 78, the number density of the Ca group element containing particles was too low. As a result, S5 became less than 0.33, the remaining rate of the primary coating was 84%, and the coating adhesion was poor.

TABLE 6

| | | Additives in annealing separator | | | | | | Form of |
| | | | | | | | No. of | primary |
| | Steel | CC | CY | CT | R1 | R2 | | Ca-containing particles | coating |
| Test no. | sheet no. | (vol. %) | (vol. %) | (vol. %) | (μm) | (μm) | R2/R1 | $100,000,000/cm^3$ | S1/S0 |
| --- | --- | --- | --- | --- | --- | --- | --- | --- | --- |
| 45 | 20 | 0.72 | 0.78 | 2.03 | 0.60 | 0.80 | 1.33 | 267 | 0.18 |
| 46 | 20 | 1.76 | 0.76 | 1.61 | 1.50 | 0.80 | 0.53 | 284 | 0.19 |
| 47 | 20 | 0.66 | 2.55 | 0.94 | 1.50 | 0.80 | 0.53 | 341 | 0.24 |
| 48 | 20 | 1.98 | 2.52 | 2.48 | 1.50 | 0.80 | 0.53 | 295 | 0.25 |
| 49 | 20 | 0.54 | 0.87 | 1.89 | 1.50 | 0.80 | 0.53 | 316 | 0.23 |
| 50 | 22 | 2.17 | 0.78 | 4.50 | 1.50 | 1.40 | 0.93 | 348 | 0.31 |
| 51 | 22 | 0.53 | 2.68 | 4.05 | 1.50 | 1.28 | 0.85 | 255 | 0.28 |
| 52 | 22 | 1.84 | 2.75 | 4.83 | 1.50 | 1.28 | 0.85 | 267 | 0.27 |
| 53 | 22 | 1.00 | 1.62 | 1.35 | 1.50 | 1.28 | 0.85 | 314 | 0.31 |
| 54 | 23 | 1.38 | 3.26 | 4.86 | 1.50 | 1.23 | 0.82 | 329 | 0.36 |
| 55 | 23 | 0.62 | 0.67 | 1.51 | 1.50 | 1.29 | 0.86 | 381 | 0.38 |
| 56 | 23 | 1.84 | 0.48 | 2.36 | 1.50 | 1.28 | 0.85 | 264 | 0.34 |
| 57 | 23 | 1.86 | 1.09 | 1.29 | 1.50 | 1.29 | 0.86 | 311 | 0.36 |
| 58 | 24 | 0.51 | 2.91 | 0.57 | 1.50 | 1.13 | 0.75 | 296 | 0.39 |
| 59 | 24 | 0.74 | 0.99 | 5.98 | 1.50 | 0.67 | 0.45 | 268 | 0.35 |
| 60 | 24 | 2.16 | 1.36 | 3.32 | 1.50 | 1.40 | 0.93 | 277 | 0.34 |

TABLE 6-continued

| 61 | 24 | 0.89 | 1.98 | 2.59 | 1.50 | 1.40 | 0.93 | 316 | 0.36 |
|----|----|------|------|------|------|------|------|-----|------|
| 62 | 20 | 0.00 | 0.00 | 5.14 | 1.20 | — | — | 299 | 0.12 |
| 63 | 20 | 1.65 | 2.18 | 2.59 | 1.50 | 0.20 | 0.13 | 291 | 0.28 |
| 64 | 20 | 1.27 | 2.12 | 4.29 | 0.40 | 1.50 | 3.75 | 362 | 0.24 |
| 65 | 20 | 2.86 | 1.85 | 2.17 | 1.50 | 1.40 | 0.93 | 554 | 0.28 |
| 66 | 22 | 1.88 | 3.81 | 1.70 | 1.50 | 1.40 | 0.93 | 281 | 0.26 |
| 67 | 22 | 0.35 | 1.77 | 4.32 | 1.50 | 1.40 | 0.93 | 341 | 0.14 |
| 68 | 22 | 1.69 | 0.37 | 1.64 | 1.50 | 1.40 | 0.93 | 336 | 0.24 |
| 69 | 22 | 0.38 | 2.21 | 5.63 | 1.50 | 1.40 | 0.93 | 289 | 0.09 |
| 70 | 23 | 1.81 | 0.35 | 2.26 | 1.50 | 1.40 | 0.93 | 269 | 0.22 |
| 71 | 23 | 1.40 | 3.51 | 8.91 | 1.50 | 1.40 | 0.93 | 300 | 0.26 |
| 72 | 23 | 2.43 | 2.15 | 6.53 | 1.50 | 1.40 | 0.93 | 437 | 0.18 |
| 73 | 24 | 1.40 | 3.51 | 4.86 | 0.20 | 0.07 | 0.36 | 361 | 0.13 |
| 74 | 24 | 2.43 | 2.15 | 3.36 | 1.50 | 1.68 | 1.12 | 328 | 0.14 |
| 75 | 24 | 1.40 | 3.51 | 4.53 | 0.06 | 0.17 | 2.79 | 377 | — |
| 76 | 24 | 2.43 | 2.15 | 4.46 | 1.80 | 1.20 | 0.67 | 312 | 0.12 |
| 77 | 25 | 1.00 | 1.62 | 1.35 | 1.50 | 1.28 | 0.85 | 344 | 0.08 |
| 78 | 23 | 1.86 | 1.09 | 1.29 | 1.50 | 1.32 | 0.88 | 242 | 0.28 |

| | Form of primary coating | | | Evaluation | | | Constituents in primary coating | | |
|---|---|---|---|---|---|---|---|---|---|
| Test no. | S5/S3 | H5 | D3 | Remaining rate of primary coating | Magnetic flux density B8 | Iron loss W17/50 | Content of Ca group elements in coating | D4 | Remarks |
| 45 | 0.35 | 0.78 | 0.065 | 100 | 1.924 | 0.741 | 0.520 | 0.0185 | Inv. ex. |
| 46 | 0.42 | 1.00 | 0.142 | 95 | 1.924 | 0.784 | 3.240 | 0.0802 | Inv. ex. |
| 47 | 0.38 | 3.78 | 0.081 | 97 | 1.922 | 0.769 | 0.320 | 0.0409 | Inv. ex. |
| 48 | 0.44 | 3.85 | 0.130 | 96 | 1.928 | 0.777 | 3.920 | 0.0923 | Inv. ex. |
| 49 | 0.36 | 0.96 | 0.077 | 98 | 1.928 | 0.744 | 0.340 | 0.0296 | Inv. ex. |
| 50 | 0.36 | 0.74 | 0.165 | 95 | 1.931 | 0.789 | 2.880 | 0.1300 | Inv. ex. |
| 51 | 0.36 | 2.63 | 0.133 | 97 | 1.924 | 0.805 | 0.290 | 0.0337 | Inv. ex. |
| 52 | 0.41 | 2.84 | 0.172 | 98 | 1.930 | 0.786 | 2.940 | 0.0754 | Inv. ex. |
| 53 | 0.39 | 0.89 | 0.076 | 99 | 1.928 | 0.746 | 0.840 | 0.0544 | Inv. ex. |
| 54 | 0.39 | 3.40 | 0.123 | 97 | 1.924 | 0.798 | 3.660 | 0.0907 | Inv. ex. |
| 55 | 0.35 | 0.84 | 0.099 | 95 | 1.926 | 0.763 | 0.960 | 0.0270 | Inv. ex. |
| 56 | 0.35 | 1.50 | 0.128 | 100 | 1.923 | 0.779 | 3.280 | 0.1202 | Inv. ex. |
| 57 | 0.39 | 1.01 | 0.112 | 98 | 1.924 | 0.793 | 1.990 | 0.1302 | Inv. ex. |
| 58 | 0.37 | 3.38 | 0.083 | 95 | 1.925 | 0.758 | 0.190 | 0.0273 | Inv. ex. |
| 59 | 0.36 | 1.16 | 0.070 | 97 | 1.927 | 0.741 | 0.910 | 0.0236 | Inv. ex. |
| 60 | 0.34 | 1.01 | 0.162 | 98 | 1.928 | 0.805 | 2.580 | 0.1424 | Inv. ex. |
| 61 | 0.33 | 2.86 | 0.056 | 99 | 1.930 | 0.722 | 1.200 | 0.0580 | Inv. ex. |
| 62 | 0.28 | 0.35 | 0.019 | 42 | 1.923 | 0.747 | 0.025 | 0.0000 | Comp. ex. |
| 63 | 0.22 | 1.86 | 0.120 | 72 | 1.924 | 0.784 | 0.580 | 0.1043 | Comp. ex. |
| 64 | 0.37 | 1.49 | 0.018 | 71 | 1.932 | 0.724 | 1.320 | 0.0788 | Comp. ex. |
| 65 | 0.41 | 2.26 | 0.192 | 97 | 1.921 | 0.853 | 6.230 | 0.1696 | Comp. ex. |
| 66 | 0.48 | 4.16 | 0.047 | 93 | 1.911 | 0.759 | 1.610 | 0.1303 | Comp. ex. |
| 67 | 0.22 | 1.64 | 0.016 | 82 | 1.928 | 0.730 | 0.052 | 0.0073 | Comp. ex. |
| 68 | 0.39 | 0.54 | 0.039 | 69 | 1.929 | 0.697 | 3.330 | 0.0357 | Comp. ex. |
| 69 | 0.22 | 1.59 | 0.014 | 78 | 1.924 | 0.755 | 0.082 | 0.0077 | Comp. ex. |
| 70 | 0.38 | 0.42 | 0.038 | 71 | 1.930 | 0.696 | 5.100 | 0.1127 | Comp. ex. |
| 71 | 0.42 | 1.25 | 0.205 | 98 | 1.932 | 0.861 | 1.280 | 0.0566 | Comp. ex. |
| 72 | 0.44 | 3.36 | 0.188 | 99 | 1.922 | 0.855 | 5.200 | 0.0730 | Comp. ex. |
| 73 | 0.42 | 2.56 | 0.082 | 69 | 1.924 | 0.754 | 1.280 | 0.0579 | Comp. ex. |
| 74 | 0.44 | 1.50 | 0.130 | 78 | 1.932 | 0.760 | 5.200 | 0.0923 | Comp. ex. |
| 75 | — | — | — | — | — | — | — | — | Comp. ex. |
| 76 | 0.24 | 0.26 | 0.011 | 84 | 1.928 | 0.738 | 5.200 | 0.0710 | Comp. ex. |
| 77 | 0.26 | 0.22 | 0.008 | 10 | 1.958 | 0.660 | 4.200 | 0.0990 | Comp. ex. |
| 78 | 0.44 | 1.20 | 0.009 | 84 | 1.944 | 0.721 | 3.280 | 0.0180 | Comp. ex. |

Above, embodiments of the present invention were explained. However, the embodiments explained above are only illustrations for working the present invention. Therefore, the present invention is not limited to the embodiments explained above and can be worked while suitably changing the embodiments explained above within a scope not deviating from its gist.

REFERENCE SIGNS LIST

1. surface oxide layer
2. anchoring oxide layer
3. deepest anchoring position
A0. entire observed region
A1. anchoring oxide region
A2. surface oxide layer region
A3. Al (aluminum) concentrated region
A4. Ca group element concentrated region
A5. Al (aluminum) concentrated region present inside anchoring oxide region.

The invention claimed is:
1. A grain-oriented electrical steel sheet comprising
 a base steel sheet having a chemical composition comprising, by mass %,
 C: 0.0050% or less,
 Si: 2.5 to 4.5%,
 Mn: 0.02 to 0.20%, one or more elements selected from the group comprised of S and Se: total of 0.005% or less,
sol. Al: 0.004% or less, and
N: 0.010% or less and
having a balance comprised of Fe and impurities and
a primary coating formed on a surface of the base steel sheet and comprising 50 to 95% by mass of $Mg_2SiO_4$ as a constituent, where,
in a correlation distribution chart, which represents a correlation of a characteristic X-ray intensity and a surface height of the primary coating from a surface of the primary coating opposite to the base steel sheet obtained by projecting the surface height of the primary coating and constituent information in the primary coating on a plane having an area of 20 μm×15 μm parallel to a base steel sheet side, wherein a direction from a primary coating side toward the base steel sheet in a thickness direction of the base steel sheet is defined as positive,
when designating a center value of the surface height of the primary coating as H0, designating the primary coating existing at the height of H0+0.2 μm or more on the base steel sheet side as an "anchoring oxide layer region", and designating the primary coating existing at the height of less than H0+0.2 μm on the primary coating side as a "surface oxide layer region",
identifying a maximum value of the characteristic X-ray intensity of Al, and designating a region in which a characteristic X-ray intensity of Al is 20% or more of the maximum value of the Al as an "Al concentrated region",
the primary coating satisfies the conditions of
(1) number density D3 of Al concentrated regions: 0.020 to 0.180/μm$^2$,
(2) (total area S5 of Al concentrated regions in anchoring oxide layer regions)/(total area S3 of Al concentrated regions)≥33%,
(3) distance H5 subtracting H0 from mean value of height of regions which is anchoring oxide layer regions and is also Al concentrated regions in thickness direction: 0.4 to 4.0 μm, and
(4) (total area S1 of anchoring oxide layer regions)/(observed area S0)≥15%.

2. The grain-oriented electrical steel sheet according to claim 1, wherein
the primary coating comprises one or more elements selected from a group comprising Y, La, and Ce and one or more elements selected from a group comprising Ca, Sr, and Ba and,
in the correlation distribution chart of a characteristic X-ray intensity and a surface height of the primary coating, when identifying the maximum values of the characteristic X-ray intensities of Ca, Sr, and Ba and designating a region in which a characteristic X-ray intensity of Ca of 20% or more of the maximum value of the Ca is obtained, a region in which a characteristic X-ray intensity of Sr of 20% or more of the maximum value of the Sr is obtained, and a region in which a characteristic X-ray intensity of Ba of 20% or more of the maximum value of the Ba is obtained together as a "Ca group element concentrated region",
the primary coating satisfies the conditions of
(5) a ratio of a total content of one or more elements selected from a group comprising Y, La, and Ce to the content of $Mg_2 SiO_4$ in the primary coating: 0.1 to 6.0 mass %,
(6) a ratio of a total content of one or more elements selected from a group comprising Ca, Sr, and Ba to the content of $Mg_2 SiO_4$ in the primary coating: 0.1 to 6.0 mass %, and
(7) a number density D4 of the Ca group element concentrated regions: 0.008/μm$^2$ or more.

3. An annealing separator used for manufacture of the grain-oriented electrical steel sheet according to claim 1, having MgO as a main constituent,
which the annealing separator comprising one or more elements selected from a group comprising Y, La, and Ce and one or more elements selected from a group comprising Ca, Sr, and Ba,
when expressing ratios of contents of Mg, Y, La, Ce, Ca, Sr, and Ba to the content of MgO (mass %) as respectively [Mg], [Y], [La], [Ce], [Ca], [Sr], and [Ba],
satisfying
(8) (0.253[Y]+0.180[La]+0.170[Ce])/0.454[Mg]: 0.40 to 3.60 and
(9) (0.353[Ca]+0.252[Sr]+0.195[Ba])/0.454[Mg]: 0.20 to 2.20, and
furthermore, satisfying the conditions of
(10) mean particle size R1 of MgO: 0.08 to 1.50 μm,
(11) mean particle size R2 of particles comprising one or more elements selected from a group comprising Ca, Sr, and Ba in the Ca group element concentrated regions: 0.08 to 1.50 μm,
(12) (mean particle size R2)/(mean particle size R1): 0.3 to 3.0, and
(13) number density of particles comprising Ca group elements≥25,000,000,000/cm$^3$.

4. The annealing separator according to claim 3, wherein the particles comprising one or more elements selected from a group comprising Y, La, and Ce further comprise oxygen.

5. The annealing separator according to claim 3, further comprising one or more elements selected from a group comprising Ti, Zr, and Hf.

6. A method for manufacturing grain-oriented electrical steel sheet comprising
a process for hot rolling a slab comprising, by mass %,
C: 0.100% or less,
Si: 2.5 to 4.5%,
Mn: 0.02 to 0.20%,
one or more elements selected from the group comprised of S and Se: total of 0.005 to 0.070%,
sol. Al: 0.005 to 0.050%, and
N: 0.001 to 0.030% and
having a balance comprised of Fe and impurities
to manufacture hot rolled steel sheet,
a process of cold rolling the hot rolled steel sheet by a cold rolling rate of 80% or more to manufacture cold rolled steel sheet,
a process of decarburization annealing the cold rolled steel sheet to manufacture decarburization annealed sheet,
a process of coating a surface of the decarburization annealed sheet with an aqueous slurry and drying the sheet, and
a process of finish annealing the steel sheet after the aqueous slurry has dried, wherein
the aqueous slurry comprises an annealing separator of claim 3.

7. The method for manufacturing grain-oriented electrical steel sheet according to claim 6, wherein the slab further comprises, in place of part of the Fe, one or more elements selected from a group comprised of Bi, Te, and Pb in a total of 0.030% or less.

8. The method for manufacturing grain-oriented electrical steel sheet according to claim 6, wherein the slab further comprises, in place of part of the Fe, one or more elements selected from a group comprised of Cu, Sn, and Sb in a total of 0.60% or less.

9. A method for manufacturing finish annealing-use steel sheet for manufacturing grain-oriented electrical steel sheet according to claim 1, comprising
a process for hot rolling a slab comprising, by mass %,
C: 0.100% or less,
Si: 2.5 to 4.5%,
Mn: 0.02 to 0.20%,
one or more elements selected from the group comprised of S and Se: total of 0.005 to 0.070%,
sol. Al: 0.005 to 0.050%, and
N: 0.001 to 0.030% and
having a balance comprised of Fe and impurities
to manufacture hot rolled steel sheet,
a process of cold rolling the hot rolled steel sheet by a cold rolling rate of 80% or more to manufacture cold rolled steel sheet,
a process of decarburization annealing the cold rolled steel sheet to manufacture decarburization annealed sheet, and
a process of coating a surface of the decarburization annealed sheet with an aqueous slurry and drying the sheet, wherein
the aqueous slurry comprises an annealing separator having MgO as a main constituent,
which the annealing separator comprising one or more elements selected from a group comprising Y, La, and Ce and one or more elements selected from a group comprising Ca, Sr, and Ba,
when expressing ratios of contents of Mg, Y, La, Ce, Ca, Sr, and Ba to the content of MgO (mass %) as respectively [Mg], [Y], [La], [Ce], [Ca], [Sr], and [Ba],
satisfying
(8) (0.253[Y]+0.180[La]+0.170[Ce])/0.454[Mg]: 0.40 to 3.60 and
(9) (0.353[Ca]+0.252[Sr]+0.195[Ba])/0.454[Mg]: 0.20 to 2.20, and
furthermore, satisfying the conditions of
(10) mean particle size R1 of MgO: 0.08 to 1.50 μm,
(11) mean particle size R2 of particles comprising one or more elements selected from a group comprising Ca, Sr, and Ba in the Ca group element concentrated regions: 0.08 to 1.50 μm,
(12) (mean particle size R2)/(mean particle size R1): 0.3 to 3.0, and
(13) number density of particles comprising Ca group elements≥25,000,000,000/cm³.

10. The method for manufacturing finish annealing-use steel sheet according to claim 9, wherein the slab further comprises, in place of part of the Fe, one or more elements selected from the group comprised of Bi, Te, and Pb in a total of 0.030% or less.

11. The method for manufacturing finish annealing-use steel sheet according to claim 9, wherein the slab further comprises, in place of part of the Fe, one or more elements selected from the group comprised of Cu, Sn, and Sb in a total of 0.60% or less.

12. A method for manufacturing grain-oriented electrical steel sheet according to claim 1, comprising
a process for hot rolling a slab comprising, by mass %,
C: 0.100% or less,
Si: 2.5 to 4.5%,
Mn: 0.02 to 0.20%,
one or more elements selected from the group comprised of S and Se: total of 0.005 to 0.070%,
sol. Al: 0.005 to 0.050%, and
N: 0.001 to 0.030% and
having a balance comprised of Fe and impurities
to manufacture hot rolled steel sheet,
a process of cold rolling the hot rolled steel sheet by a cold rolling rate of 80% or more to manufacture cold rolled steel sheet,
a process of decarburization annealing the cold rolled steel sheet to manufacture decarburization annealed sheet,
a process of coating a surface of the decarburization annealed sheet with an aqueous slurry and drying the sheet, and
a process of finish annealing the steel sheet after the aqueous slurry has dried,
wherein
the aqueous slurry comprises an annealing separator having MgO as a main constituent,
which the annealing separator comprising one or more elements selected from a group comprising Y, La, and Ce and one or more elements selected from a group comprising Ca, Sr, and Ba,
when expressing ratios of contents of Mg, Y, La, Ce, Ca, Sr, and Ba to the content of MgO (mass %) as respectively [Mg], [Y], [La], [Ce], [Ca], [Sr], and [Ba],
satisfying
(8) (0.253[Y]+0.180[La]+0.170[Ce])/0.454[Mg]: 0.40 to 3.60 and
(9) (0.353[Ca]+0.252[Sr]+0.195[Ba])/0.454[Mg]: 0.20 to 2.20, and
furthermore, satisfying the conditions of
(10) mean particle size R1 of MgO: 0.08 to 1.50 μm,
(11) mean particle size R2 of particles comprising one or more elements selected from a group comprising Ca, Sr, and Ba in the Ca group element concentrated regions: 0.08 to 1.50 μm,
(12) (mean particle size R2)/(mean particle size R1): 0.3 to 3.0, and
(13) number density of particles comprising Ca group elements≥25,000,000,000/cm³,
wherein the particles comprising one or more elements selected from a group comprising Y, La, and Ce further comprise oxygen.

13. A method for manufacturing grain-oriented electrical steel sheet according to claim 1, comprising
a process for hot rolling a slab comprising, by mass %,
C: 0.100% or less,
Si: 2.5 to 4.5%,
Mn: 0.02 to 0.20%,
one or more elements selected from the group comprised of S and Se: total of 0.005 to 0.070%,
sol. Al: 0.005 to 0.050%, and
N: 0.001 to 0.030% and
having a balance comprised of Fe and impurities
to manufacture hot rolled steel sheet,
a process of cold rolling the hot rolled steel sheet by a cold rolling rate of 80% or more to manufacture cold rolled steel sheet,
a process of decarburization annealing the cold rolled steel sheet to manufacture decarburization annealed sheet,
a process of coating a surface of the decarburization annealed sheet with an aqueous slurry and drying the sheet, and a process of finish annealing the steel sheet after the aqueous slurry has dried, wherein the aqueous slurry comprises an annealing separator having MgO as a main constituent, which the annealing separator comprising one or more elements selected from a group comprising Y, La, and Ce and one or more elements selected from a group comprising Ca, Sr, and Ba, when expressing ratios of contents of Mg, Y, La, Ce, Ca, Sr, and Ba to the content of MgO (mass %) as respectively [Mg], [Y], [La], [Ce], [Ca], [Sr], and [Ba], satisfying (8) (0.253[Y]+0.180[La]+0.170[Ce])/0.454[Mg]: 0.40 to 3.60 and (9) (0.353[Ca]+0.252[Sr]+0.195[Ba])/0.454[Mg]: 0.20 to 2.20, and furthermore, satisfying the conditions of

(10) mean particle size R1 of MgO: 0.08 to 1.50 μm,

(11) mean particle size R2 of particles comprising one or more elements selected from a group comprising Ca, Sr, and Ba in the Ca group element concentrated regions: 0.08 to 1.50 μm,

(12) (mean particle size R2)/(mean particle size R1): 0.3 to 3.0, and

(13) number density of particles comprising Ca group elements≥25,000,000,000/cm$^3$, further comprising one or more elements selected from a group comprising Ti, Zr, and Hf.

14. The method for manufacturing grain-oriented electrical steel sheet according to claim 7, wherein the slab further comprises, in place of part of the Fe, one or more elements selected from a group comprised of Cu, Sn, and Sb in a total of 0.60% or less.

15. A method for manufacturing finish annealing-use steel sheet for manufacturing grain-oriented electrical steel sheet according to claim 1, comprising a process for hot rolling a slab comprising, by mass %, C: 0.100% or less, Si: 2.5 to 4.5%, Mn: 0.02 to 0.20%, one or more elements selected from the group comprised of S and Se: total of 0.005 to 0.070%, sol. Al: 0.005 to 0.050%, and N: 0.001 to 0.030% and having a balance comprised of Fe and impurities to manufacture hot rolled steel sheet, a process of cold rolling the hot rolled steel sheet by a cold rolling rate of 80% or more to manufacture cold rolled steel sheet, a process of decarburization annealing the cold rolled steel sheet to manufacture decarburization annealed sheet, and a process of coating a surface of the decarburization annealed sheet with an aqueous slurry and drying the sheet, wherein the aqueous slurry comprises an annealing separator having MgO as a main constituent, which the annealing separator comprising one or more elements selected from a group comprising Y, La, and Ce and one or more elements selected from a group comprising Ca, Sr, and Ba, when expressing ratios of contents of Mg, Y, La, Ce, Ca, Sr, and Ba to the content of MgO (mass %) as respectively [Mg], [Y], [La], [Ce], [Ca], [Sr], and [Ba], satisfying (8) (0.253[Y]+0.180[La]+0.170[Ce])/0.454[Mg]: 0.40 to 3.60 and (9) (0.353[Ca]+0.252[Sr]+0.195[Ba])/0.454[Mg]: 0.20 to 2.20, and furthermore, satisfying the conditions of

(10) mean particle size R1 of MgO: 0.08 to 1.50 μm,

(11) mean particle size R2 of particles comprising one or more elements selected from a group comprising Ca, Sr, and Ba in the Ca group element concentrated regions: 0.08 to 1.50 μm,

(12) (mean particle size R2)/(mean particle size R1): 0.3 to 3.0, and

(13) number density of particles comprising Ca group elements≥25,000,000,000/cm$^3$, wherein the particles comprising one or more elements selected from a group comprising Y, La, and Ce further comprise oxygen.

16. A method for manufacturing finish annealing-use steel sheet for manufacturing grain-oriented electrical steel sheet according to claim 1, comprising a process for hot rolling a slab comprising, by mass %, C: 0.100% or less, Si: 2.5 to 4.5%, Mn: 0.02 to 0.20%, one or more elements selected from the group comprised of S and Se: total of 0.005 to 0.070%, sol. Al: 0.005 to 0.050%, and N: 0.001 to 0.030% and having a balance comprised of Fe and impurities to manufacture hot rolled steel sheet, a process of cold rolling the hot rolled steel sheet by a cold rolling rate of 80% or more to manufacture cold rolled steel sheet, a process of decarburization annealing the cold rolled steel sheet to manufacture decarburization annealed sheet, and a process of coating a surface of the decarburization annealed sheet with an aqueous slurry and drying the sheet, wherein the aqueous slurry comprises an annealing separator having MgO as a main constituent, which the annealing separator comprising one or more elements selected from a group comprising Y, La, and Ce and one or more elements selected from a group comprising Ca, Sr, and Ba, when expressing ratios of contents of Mg, Y, La, Ce, Ca, Sr, and Ba to the content of MgO (mass %) as respectively [Mg], [Y], [La], [Ce], [Ca], [Sr], and [Ba], satisfying (8) (0.253[Y]+0.180[La]+0.170[Ce])/0.454[Mg]: 0.40 to 3.60 and (9) (0.353[Ca]+0.252[Sr]+0.195[Ba])/0.454[Mg]: 0.20 to 2.20, and furthermore, satisfying the conditions of

(10) mean particle size R1 of MgO: 0.08 to 1.50 μm,

(11) mean particle size R2 of particles comprising one or more elements selected from a group comprising Ca, Sr, and Ba in the Ca group element concentrated regions: 0.08 to 1.50 μm,

(12) (mean particle size R2)/(mean particle size R1): 0.3 to 3.0, and

(13) number density of particles comprising Ca group elements≥25,000,000,000/cm$^3$, further comprising one or more elements selected from a group comprising Ti, Zr, and Hf.

17. The method for manufacturing finish annealing-use steel sheet according to claim 10, wherein the slab further comprises, in place of part of the Fe, one or more elements selected from the group comprised of Cu, Sn, and Sb in a total of 0.60% or less.

* * * * *